United States Patent
Gotze et al.

(10) Patent No.: US 9,742,563 B2
(45) Date of Patent: Aug. 22, 2017

(54) SECURE PROVISIONING OF SECRET KEYS DURING INTEGRATED CIRCUIT MANUFACTURING

(71) Applicant: Intel Corporation, Santa Clara, CA (US)

(72) Inventors: Kevin C. Gotze, Hillsboro, OR (US); Gregory M. Iovino, Portland, OR (US); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/631,512

(22) Filed: Sep. 28, 2012

(65) Prior Publication Data

US 2014/0093074 A1    Apr. 3, 2014

(51) Int. Cl.
- *H04L 9/00* (2006.01)
- *H04L 9/08* (2006.01)
- *H04L 9/32* (2006.01)

(52) U.S. Cl.
CPC .......... *H04L 9/0866* (2013.01); *H04L 9/3278* (2013.01)

(58) Field of Classification Search
None
See application file for complete search history.

(56) References Cited

U.S. PATENT DOCUMENTS

| | | | | |
|---|---|---|---|---|
| 7,310,821 | B2 * | 12/2007 | Lee | G06F 21/10 705/51 |
| 7,386,721 | B1 * | 6/2008 | Vilhuber | H04L 63/0442 709/220 |
| 7,681,103 | B2 * | 3/2010 | Devadas et al. | 714/752 |
| 7,757,083 | B2 * | 7/2010 | Devadas et al. | 713/168 |
| 7,761,714 | B2 * | 7/2010 | Luzzi | H04L 9/0866 326/8 |
| 7,813,507 | B2 | 10/2010 | Brickell et al. | |
| 7,818,569 | B2 * | 10/2010 | Devadas et al. | 713/168 |
| 7,840,803 | B2 * | 11/2010 | Clarke et al. | 713/168 |
| 7,904,731 | B2 * | 3/2011 | Devadas et al. | 713/189 |
| 8,386,801 | B2 * | 2/2013 | Devadas et al. | 713/189 |
| 8,402,401 | B2 * | 3/2013 | Chakraborty | G06F 17/505 713/189 |
| 8,667,265 | B1 * | 3/2014 | Hamlet | H04L 9/0866 326/80 |
| 8,860,448 | B2 * | 10/2014 | Lee | G01R 1/07385 324/754.07 |
| 2007/0183194 | A1 * | 8/2007 | Devadas | G06F 21/31 365/185.03 |
| 2010/0250936 | A1 * | 9/2010 | Kusakawa | H04L 9/3278 713/169 |

(Continued)

*Primary Examiner* — Dede Zecher
*Assistant Examiner* — Richard A McCoy
(74) *Attorney, Agent, or Firm* — Vecchia Patent Agent, LLC

(57) ABSTRACT

A method, of an aspect, includes challenging a set of Physically Unclonable Function (PUF) cells, of an integrated circuit device, and receiving a set of PUF bits from the PUF cells in response. A PUF key is generated based on the set of PUF bits. An encryption of the PUF key with an embedded key is output from the integrated circuit device. The integrated circuit device receives an encryption of a fuse key with the PUF key. Fuses of the integrated circuit device are programmed with at least one of the fuse key and the received encryption of the fuse key with the PUF key. Other methods, apparatus, and systems are also disclosed.

17 Claims, 18 Drawing Sheets

(56) References Cited

U.S. PATENT DOCUMENTS

| | | | | |
|---|---|---|---|---|
| 2010/0275036 A1* | 10/2010 | Harada | G06F 21/10 | 713/189 |
| 2011/0010770 A1* | 1/2011 | Smith | G06F 21/71 | 726/18 |
| 2012/0131340 A1* | 5/2012 | Teuwen | H04L 9/3278 | 713/168 |
| 2012/0137137 A1* | 5/2012 | Brickell | H04L 9/0816 | 713/182 |
| 2012/0198243 A1* | 8/2012 | Matsushima | G06F 21/14 | 713/193 |
| 2012/0204023 A1* | 8/2012 | Kuipers | G06F 21/10 | 713/150 |
| 2012/0224695 A1* | 9/2012 | Hashimoto | H04L 9/0825 | 380/279 |
| 2012/0324310 A1* | 12/2012 | Oshida | H04L 9/3278 | 714/755 |
| 2013/0051552 A1* | 2/2013 | Handschuh | G06F 21/602 | 380/44 |
| 2013/0141137 A1* | 6/2013 | Krutzik | H03K 19/173 | 326/8 |
| 2013/0147511 A1* | 6/2013 | Koeberl | H03K 19/23 | 326/8 |
| 2013/0185611 A1* | 7/2013 | Goettfert | G06F 11/1008 | 714/766 |
| 2013/0194886 A1* | 8/2013 | Schrijen | G06F 7/588 | 365/226 |
| 2013/0254636 A1* | 9/2013 | Kirkpatrick | H04L 9/0866 | 714/784 |
| 2014/0189365 A1 | 7/2014 | Cox et al. | | |
| 2014/0201540 A1 | 7/2014 | Li et al. | | |
| 2014/0266297 A1 | 9/2014 | Mathew et al. | | |

* cited by examiner

METHOD OF PROVISIONING KEYS DURING MANUFACTURING 440

SECOND EMBODIMENT MANUFACTURING SYSTEM 800

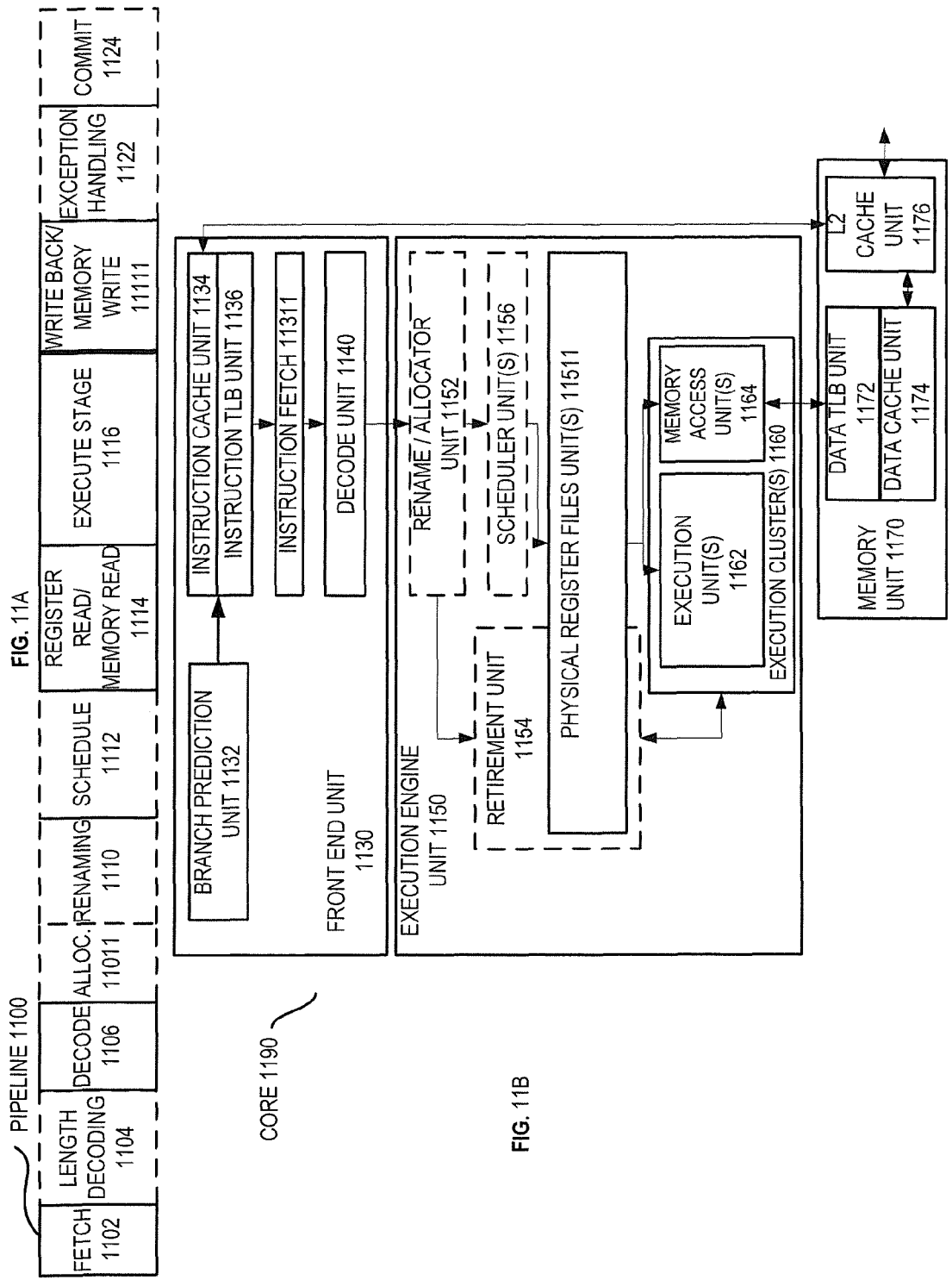

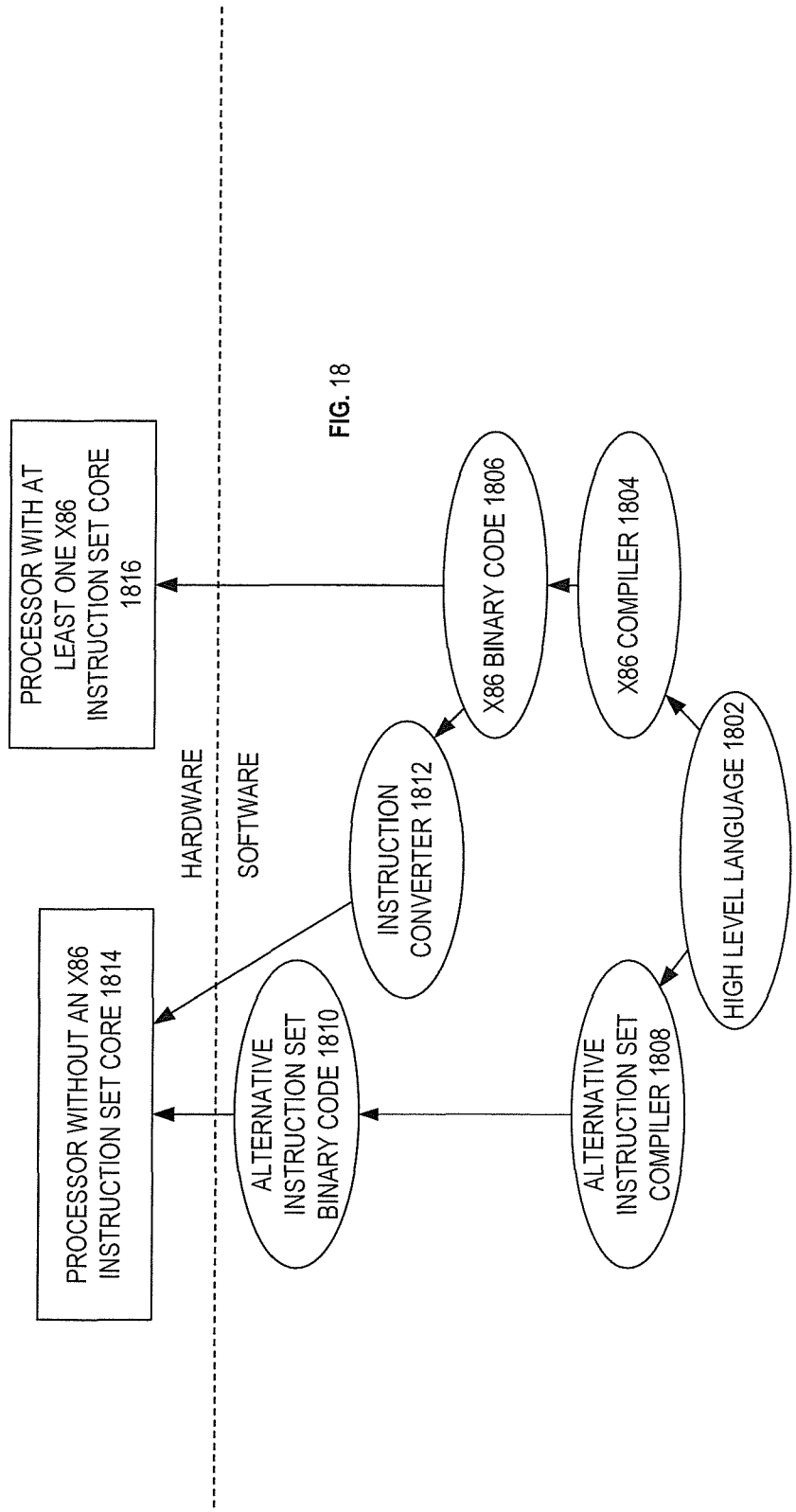

SECURE PROVISIONING OF SECRET KEYS DURING INTEGRATED CIRCUIT MANUFACTURING

BACKGROUND

Field

Embodiments relate to integrated circuit security. In particular, embodiments relate to provisioning of secret keys during integrated circuit manufacturing.

Background Information

Computers (e.g., desktop, laptop, pad computers, etc.), cell phones, multimedia content players, and various other types of consumer electronics or electronic devices, are commonly used to handle sensitive or secure information. By way of example, the sensitive or secure information may include financial information, confidential documents, personal emails, digital rights protected content, etc.

Processors, chip set components, systems-on-chips (SoCs), security-related integrated circuits, and other types of integrated circuits used in such electronic devices are commonly provisioned with secrets, such as secret keys or secure keys, which are used to protect the sensitive or secure information. The secret keys or secure keys are often provisioned to the integrated circuits during manufacture.

During use, the secret or secure keys may be provided to any of various different types of key-utilizing security logic of the integrated circuits, such as, for example, cryptographic modules or circuits, crypto-processors, crypto-co-processors, trusted platform modules, security engines, security controllers, or the like. Such security logic may use the secret or secure keys to protect the sensitive or secure information in various ways, such as, for example, through encryption, decryption, authentication, digital signatures, and various other ways known in the arts.

During the manufacturing process, while provisioning the secure or secret keys to the integrated circuits, there is a general risk that the secret or secure keys being provisioned could be maliciously obtained. If the keys were maliciously obtained, it could compromise, or at least contribute to compromising, the security of the integrated circuits and/or the sensitive information handled by the integrated circuits.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 11A is a block diagram illustrating both an exemplary in-order pipeline and an exemplary register renaming, out-of-order issue/execution pipeline according to embodiments of the invention.

FIG. 11B is a block diagram illustrating both an exemplary embodiment of an in-order architecture core and an exemplary register renaming, out-of-order issue/execution architecture core to be included in a processor according to embodiments of the invention.

FIG. 18 is a block diagram contrasting the use of a software instruction converter to convert binary instructions in a source instruction set to binary instructions in a target instruction set according to embodiments of the invention.

DETAILED DESCRIPTION

In the following description, numerous specific details, such as specific manufacturing systems, types of secure keys, orders of operations, logic partitioning/integration details, types and interrelationships of components, and the like, are set forth. However, it is understood that embodiments of the invention may be practiced without these specific details. In other instances, well-known circuits, structures and techniques have not been shown in detail in order not to obscure the understanding of this description.

Figure 1:
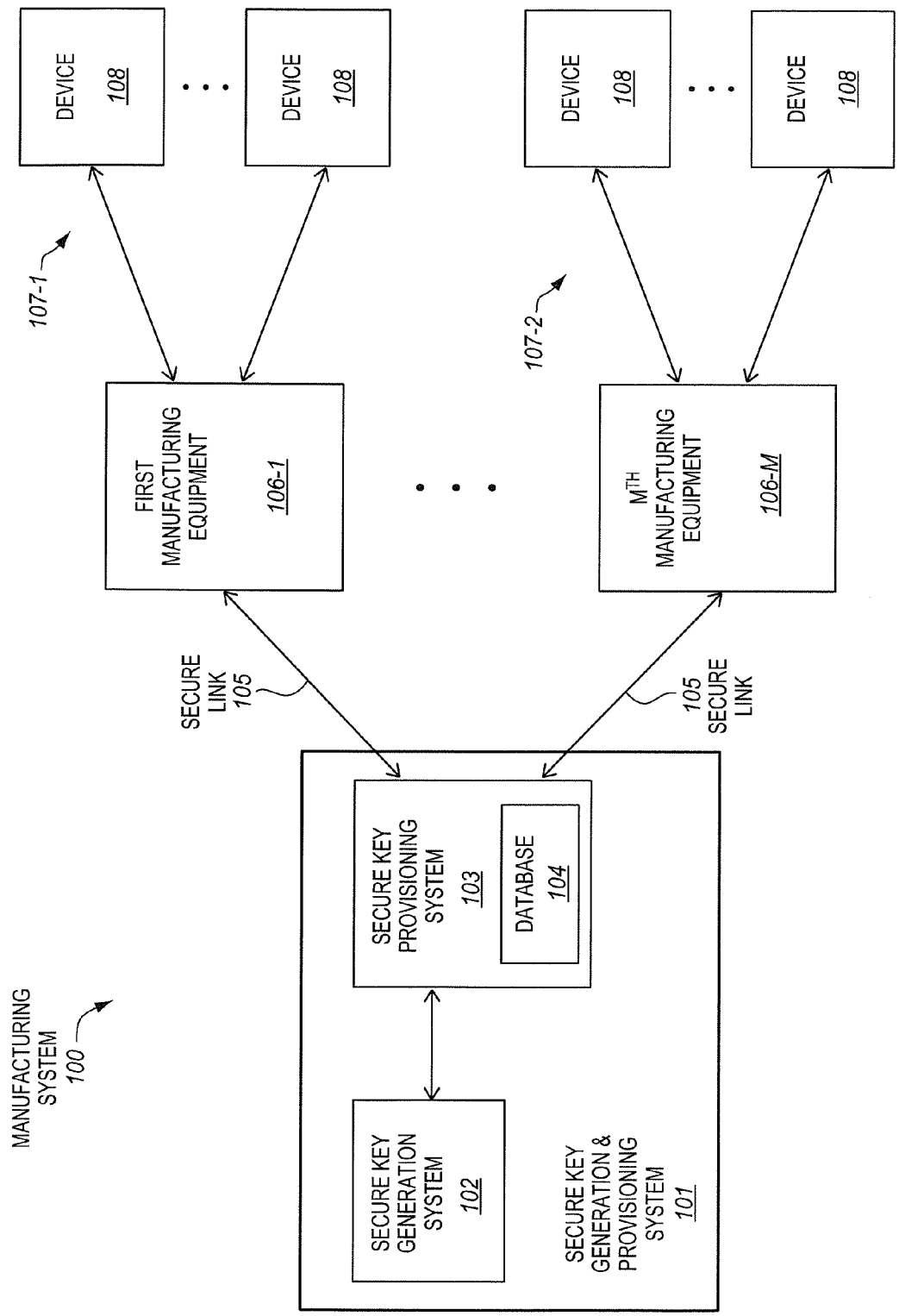
FIG. 1 is a block diagram of an embodiment of a manufacturing system.

FIG. 1 is a block diagram of an embodiment of a manufacturing system 100. The manufacturing system includes a key generation and provisioning system 101, manufacturing equipment 106, and a number of devices 108 (e.g., processors, chipset components, or other integrated circuits). The key generation and provisioning system includes a key generation system 102 that is operable to generate secrete or secure keys for the devices. The key generation system is coupled with, or otherwise in communication with, a key provisioning system 103 and may provide the generated keys to the key provisioning system. Commonly the generated keys may be provided in an encrypted or otherwise secure form. The key provisioning system has a database 104 to store the keys. The key generation and provisioning system may be implemented on one or more computer systems at one or more geographical locations. In some cases, the key generation system may reside at a relatively highly-secure facility (e.g., a corporate headquarters) and portions of the key provisioning system may reside at different geographical locations where the manufacturing equipment is deployed, although this is not required. Commonly, both the key generation system and the key provisioning system are regarded as being relatively highly secure (e.g., they may be deployed at secure facilities and may have good protections in place to protect the secure key materials).

The manufacturing equipment 106 is coupled with, or otherwise in communication with, the key provisioning system 103. The manufacturing equipment includes a first manufacturing equipment 106-1 through an Mth manufacturing equipment 106-M, where M may be any appropriate amount often on the order of around several to tens. The generated keys may be provided from the key provisioning system to the manufacturing equipment. The generated keys are often sent over secure links (e.g., links protected by secure sockets layer, or the like). The first manufacturing equipment 106-1 is also coupled with a first set 107-1 of devices 108. Likewise, the Mth manufacturing equipment 106-M is coupled with a second set 107-2 of devices 108. Each of the devices may represent an integrated circuit substrate (e.g., a wafer having dice, a singulated die, or other integrated circuit substrate), a package incorporating an integrated circuit die, other microelectronic devices, etc. The integrated circuitry may be that of a processor (e.g., a general-purpose processor, special-purpose processor, etc.), chipset component, system-on-chip (SoC), security processor, security coprocessor, security controller, digital signal processors (DSPs), cryptographic processors, communications processors, or various other desired types of integrated circuits that can benefit from secure or secret keys as is known in the art.

In some embodiments, the manufacturing equipment may represent integrated circuit test and/or debug equipment, such as, for example, a tester and prober, and/or other manufacturing equipment used to burn or otherwise program fuses of devices. During manufacture, it is common to test integrated circuit devices at various stages of manufacture. This may be done for various purposes, such as, for example, to test integrated circuits, debug integrated circuits, test for proper operation, detect defects, sort properly from improperly functioning integrated circuits (e.g., that are to be discarded or reworked), program data into integrated circuits based on testing, etc. By way of example, the manufacturing equipment may have a set of electrical probes that may be used to contact exposed and/or external electrical contacts of the devices (e.g., pads, bumps, solder material, pins, or other types of electrical contacts that are accessible from outside the integrated circuit or package). The manufacturing equipment may exchange electrical signals with the devices through the probes and electrical contacts according to a test pattern. Such testing operations may take place in the same facility by the same manufacturing equipment or by multiple manufacturing equipment and/or facilities. Commonly, these operations are performed by different manufacturing equipment with different operators.

In some embodiments, the manufacturing equipment 106 may be used to provision one or more secure or secret keys from the secure key generation and provisioning system 101 to the devices 108. For example, the manufacturing equipment may be used to burn or otherwise program fuses of the devices with one or more keys. The keys programmed in the fuses are also referred to herein as fuse keys. Either prober and tester equipment may be used to program the fuses or other manufacturing equipment may be used to program the fuses whether or not that equipment is also used for testing and/or debugging. In some cases, many such fuse keys may optionally be provisioned to the devices. By way of example, in some advanced general-purpose processors of the type used in desktop and laptop computers, it is not uncommon for there to be on the order of thousands to tens of thousands of fuses programmed with fuse keys, although the invention is not so limited.

One challenge is that the manufacturing equipment 106 may not be as highly secure as desired and/or as highly secure as the key generation and provisioning facility 101. This may be due in part to the manufacturing equipment potentially being located in different geographical locations as opposed to a single highly secure corporate facility. Moreover, this may also be due in part to potentially multiple employees (e.g., operators) or other people being able to have access to the manufacturing equipment. Such factors generally pose a relatively higher risk that the manufacturing equipment may be corrupted. For example, an operator, employee, or other individual having access to the manufacturing equipment may secretly install malicious software (e.g., a corrupted testing program) to attempt to obtain secure keys. Fuse keys are potentially vulnerable, since the fuse keys are often provided to the manufacturing equipment for the manufacturing equipment to program the fuse keys into the fuses. As a result, the manufacturing equipment often has access to the individual bits of the fuse keys. If the fuse keys are obtained it may compromise, or at least contribute to compromising, the security of the devices and/or the sensitive information used therein.

Figure 2:
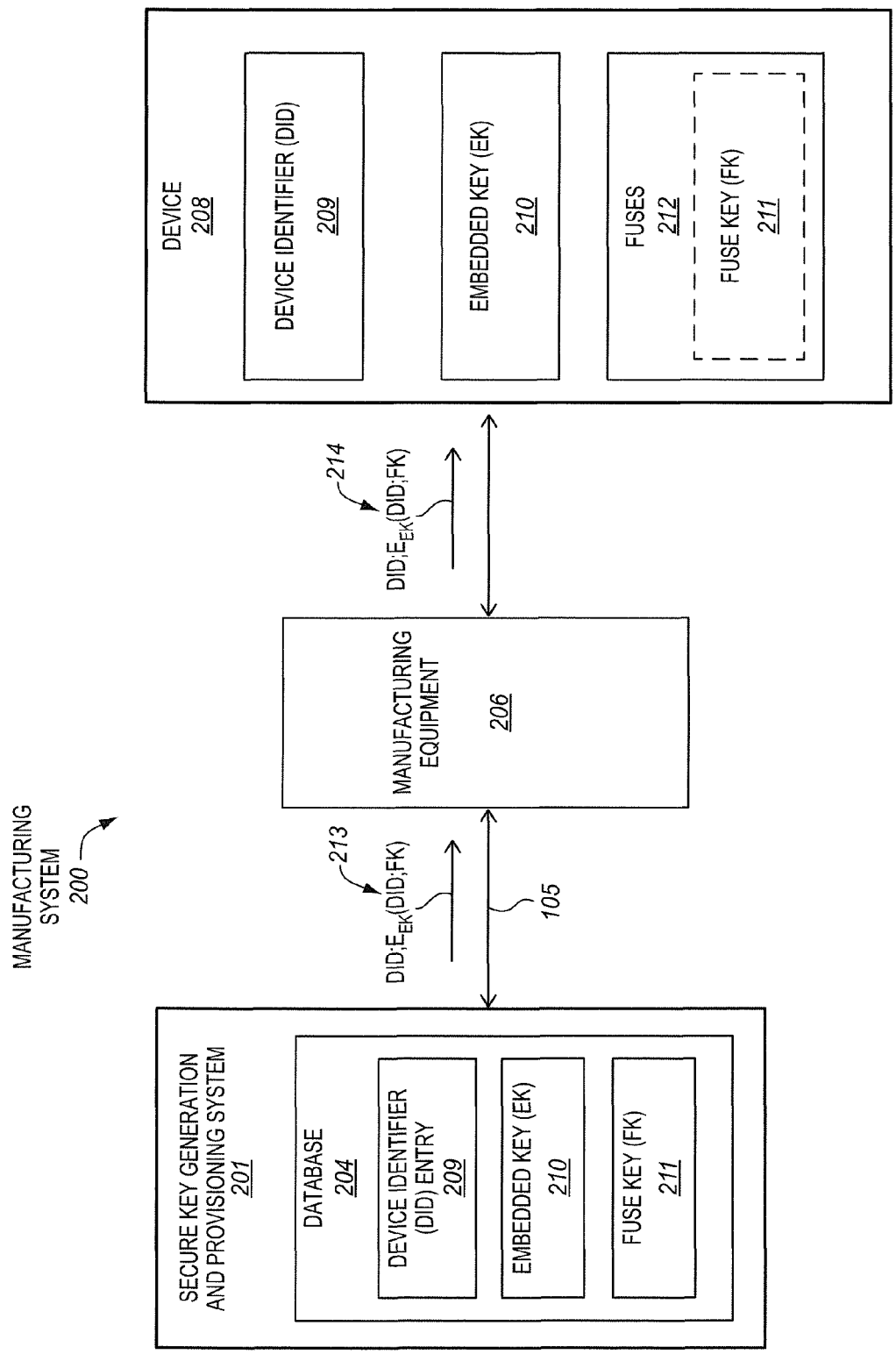
FIG. 2 is a block diagram of a manufacturing system illustrating one approach to provision fuse keys from a key generation and provisioning system to a device through manufacturing equipment.

FIG. 2 is a block diagram of a manufacturing system 200 illustrating one approach to provision fuse keys (FK) 211 from a key generation and provisioning system 201 to a device 208 through manufacturing equipment 206. Referring first to the device 208, the device has a device identifier (DID) 209 to uniquely identify the device. By way of example, the device identifier may be a unit level traceability (ULT) that is used during manufacturing to trace the particular device during the manufacturing process. Alternatively, the device identifier may be another string of bits to uniquely identify the device from other devices. The device also has an embedded key (EK) 210. The embedded key may be embedded in the device. In some embodiments, the embedded key may be fixed in the design of the processor or other part and in some embodiments may not be easily configurable or changeable (e.g., without a redesign/tape-out). In various embodiments, the embedded key may represent a key programmed in read-only memory (ROM), a key embedded in resistor-transistor logic (RTL), a key embedded in tie-ups/tie-downs of the device, or the like, or a combination of such approaches. In some embodiments, the embedded key may represent a static/hard coded universal key that is used for all devices. The device also has fuses 212, which are to be burned, programmed, or written with a fuse key (FK) 211 that is provisioned from the secure key generation and provisioning system, as described further below.

The key generation and provisioning system 201 has a database 204. The database stores the device identifier (DID) 209 for the device 208, the embedded key (EK) 210 for the device 208, and the fuse key (FK) 211 that is to be programmed in the fuses 212 of the device. In some embodiments, each device may be provisioned with a unique fuse key, although this is not required.

According to the present approach, the key generation and provisioning system creates an encryption of the fuse key (FK), and optionally also the device identifier (DID), using the embedded key (EK). This is represented in the illustration as $E_{EK}$(DID, FK), where the subscript EK designates that the embedded key (EK) is used to encrypt the data, and where the parenthesis enclose the data encrypted (in this case DID and FK). As shown at reference 213, the key generation and provisioning system sends the device identifier (DID) and the encryption $E_{EK}$(DID, FK) to the manufacturing equipment 206. The manufacturing equipment is generally allowed to know the device identifiers (DID) of the devices it is processing. However, the embedded key (EK) is generally intended to be kept a secret from the manufacturing equipment. Consequently, the manufacturing equipment generally does not know the embedded key (EK) and generally cannot decrypt the encryption $E_{EK}$(DID, FK). The manufacturing equipment may send the encryption $E_{EK}$(DID, FK) to the device 208 corresponding to the DID 209. The device 208 knows the embedded key 210, and may decrypt the encryption $E_{EK}$(DID, FK) to determine the fuse key (FK). The device may burn or otherwise program its fuses 212 with the fuse key (FK) 211.

However, one significant drawback to this approach is that the embedded keys are relatively susceptible to discovery. Although the embedded key generally cannot be read out directly from the devices, reverse engineering may be used to obtain the embedded key. For example, the reverse engineering may include physical manipulation (e.g., planarization or other mechanical deconstruction) and high technology inspection (e.g., through advanced microscopic techniques) in advanced laboratories. This poses the possibility that data encrypted using the global key (e.g., the encryption $E_{EK}$ (DID, FK)) could be obtained maliciously and stored and the combined with an embedded key obtained from reverse engineering or some other approach. This could potentially compromise, or at least contribute to compromising, the security of the devices and/or sensitive information in electronic devices.

Embodiments of methods, apparatus, and systems to provision secret or secure keys to integrated circuits or other devices during manufacture, which use Physically Unclonable Functions (PUFs) are disclosed herein. PUFs are sometimes also known in the arts as physical one-way functions (POWFs) or by other names. The PUFs may be used as an entropic source to generate PUF keys. Natural fabrication process variations may result in PUF keys that are substantially unique per device (e.g., substantially platform unique) and also substantially static for each device across the life of the device. The PUF keys may be known within the device/integrated circuit but may not initially be known externally, even to the most trusted components of a key generation and provisioning system, let alone to manufacturing equipment. One advantage to the use of the PUFs for security is that keys generated from the PUFs generally tend to be significantly less vulnerable to discovery (e.g., through reverse engineering) than embedded keys in ROM, RTL, tie-ups/tie-downs, fuses, and the like. For example, in order to determine the PUF keys the integrated circuit or device may need to be running or powered on, and not significantly unaltered in their response, which makes it more difficult to determine the values of the PUF keys through reverse engineering. Advantageously, this may help to improve the security of the integrated circuits or devices as well as sensitive information of the electronic devices in which the integrated circuits are deployed.

Figure 3:
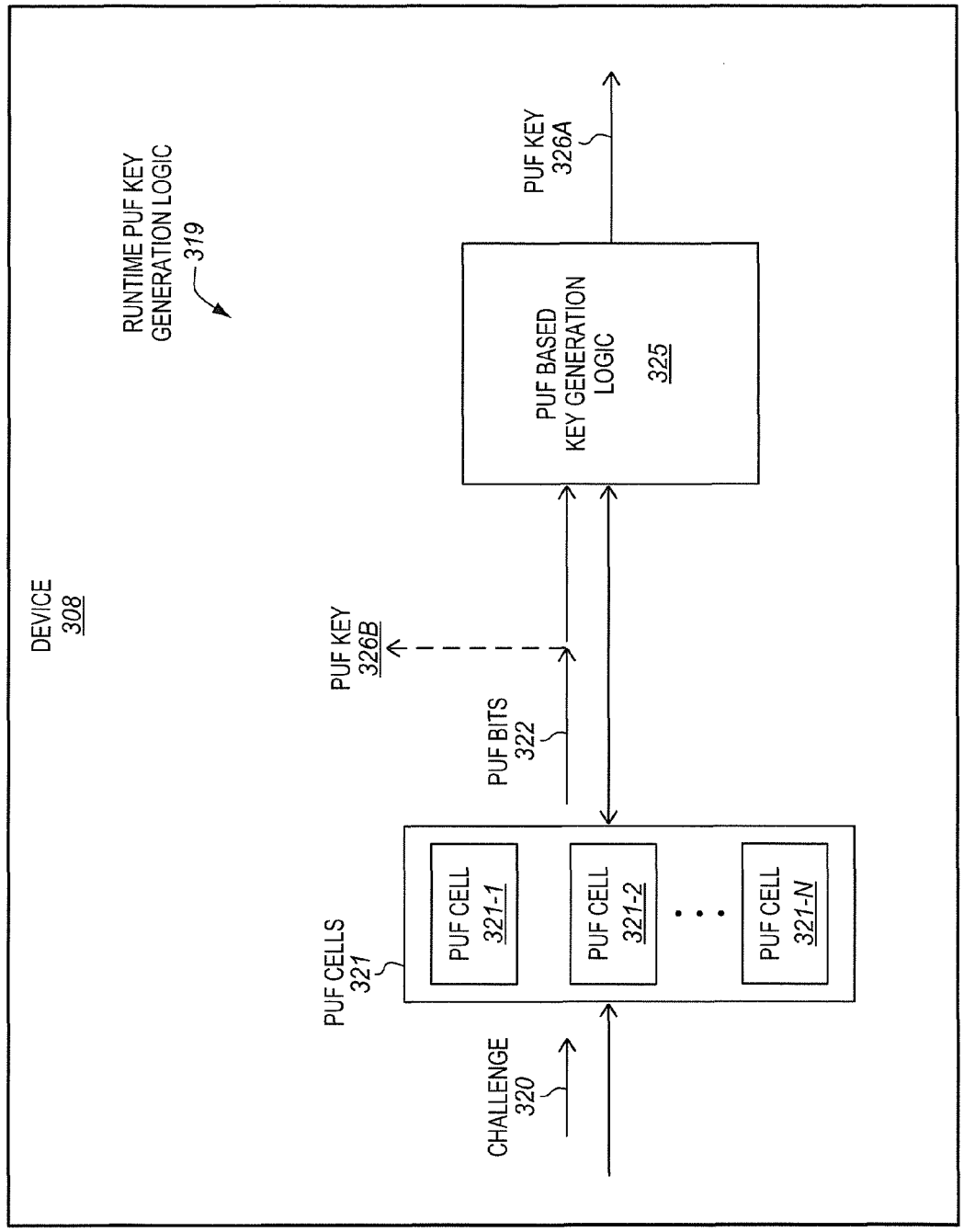
FIG. 3 is a block diagram of an embodiment of a device having runtime PUF key generation logic.

FIG. 3 is a block diagram of an embodiment of a device 308 having runtime PUF key generation logic 319. In embodiments, the device may represent an integrated circuit wafer having a plurality of un-singulated dice each having a set of PUF cells, a singled die having the set of PUF cells, or a package having a die having the set of PUF cells. The PUF key generation logic 319 includes PUF cells 321 including a first PUF cell 321-1, a second PUF cell 321-2, through an Nth PUF cell 321-N, where N may be any desired number. In various embodiments, there may be anywhere from tens, to hundreds, to thousands of PUF cells. The scope of the invention is not limited to any known number of such PUF cells.

During runtime, an input or challenge 320 (e.g., one or more electrical signals or other stimuli) may be provided to the set of PUF cells as an input. By way of example, the challenge may include one or more electrical signals applied to the PUF cells. The set of PUF cells may provide a set of PUF bits 322 as a response or output to the challenge. Some PUF cells may provide or deliver readable values. The PUF bits are not merely non-volatile bits programmed or stored in fuses, memory, or other storage medium in a digital form, but rather are typically generated during runtime. Often, the PUF bits may only exist when the device is powered on and a challenge is provided to the PUF cells. For these and other reasons, the set of PUF bits 322 may tend to be less susceptible to discovery than embedded keys (e.g., stored in ROM, RTL, or tie-ups/tie-downs), fuse keys stored in fuses, and the like.

The PUF cells 321 may be any of a wide variety of different types of PUF cells known in the arts. It tends to be difficult to place a precise circumference around all of the different types of devices, circuitry, and physical systems that are known in the arts to be PUFs. This discussion is not intended, and should not be used, to exclude devices, circuitry, and physical systems that regarded to be PUFs. Most PUFs generally represent functions (e.g., they produce an output/response from an input/challenge), which are physical (e.g., embedded in a medium, include integrated circuitry, include structures or micro-structures (e.g., microelectronic structures), include materials, are embodied in a physical medium, etc.), and which are substantially unclonable. The term substantially unclonable means that it would be extremely difficult if not infeasible, even for the manufacturer of a set of PUFs, to subsequently manufacture another copy of the set of PUFs that would have the same salient characteristics (e.g., that would provide the same output/response (e.g., PUF bits) in response to the same input/challenge), even using the same manufacturing process. The particular binary values of the first and second sets of PUF bits generated by the first and second sets of PUF cells generally depend upon the physical characteristics of the corresponding PUF cells, which in turn depend on the particular manufacturing process used to manufacture the corresponding PUF cells, including on generally uncontrollable process variations encountered during the manufacturing process, which are for practical purposes impractical or infeasible to reproduce precisely.

In some embodiments, the set of PUF cells 321 may represent silicon or semiconductor intrinsic PUF cells. In some embodiments, the set of PUF cells may have been manufactured using a complementary metal oxide semiconductor (CMOS) manufacturing process that is also used to manufacture transistors and/or other logic elements of the device 308. In some embodiments, each of the PUF cells may be embedded within an integrated circuit substrate, for example including integrated circuitry or structures or devices formed of silicon and/or by a CMOS process. Examples of suitable types of PUFs include, but are not limited to, delay PUFs (e.g., intrinsic PUFs based on digital delay measurements), delay loop PUFs, memory PUFS (e.g., intrinsic PUFs based on settling state of digital memory elements), SRAM PUFs, cross-coupled PUFs, arbiter PUFs (e.g., PUFs based on MUXes and an arbiter), ring-oscillator PUFs, bistable ring PUFs, butterfly PUFs, latch PUFs, flip-flop PUFs, D-type flip-flop PUFs, coating PUFs, and additional semiconductor or CMOS PUFs known in the arts.

The PUF bits generally tend to be substantially static. For example, when reading PUF bits from the PUF cells multiple times, typically a vast majority of the PUF bits tend to have the same binary value from one read to the next.

The PUF bits generated from different sets of PUF cells also tend to be substantially entropic. The entropy measures the quality or level of randomness of generated PUF bits. When there is a relatively high level of entropy, then the likelihood of an identical set of PUF bits being generated from different sets of PUF cells tends to be relatively low. For example, the PUF bits output from a first set of PUF cells may be "01101," the PUF bits output from a second different set of PUF cells may be "10100," the PUF bits output from a third still different set of PUF cells may be "10111," etc. When there is a relatively high level of entropy, there should be approximately equal likelihood of each bit having either a binary-0 or a binary-1, such that given enough sets of PUF bits, a string of PUF bits should approximately span all of the possible binary values to provide a relatively high level of randomness of values.

Referring again to FIG. 3, the device optionally includes PUF based key generation logic 325. In some embodiments, the PUF bits 322 may be provided from the PUF cells to the PUF based key generation logic. In some embodiments, the PUF based key generation logic may output a PUF key 326A. In other embodiments, the PUF bits 322 directly from the PUF cells 321 may be used as a PUF key 326B. Combinations of these approaches may also be used. Components, features, and details described above for FIG. 3 may also optionally be used in any one or more of FIGS. 4-10.

Figure 4:
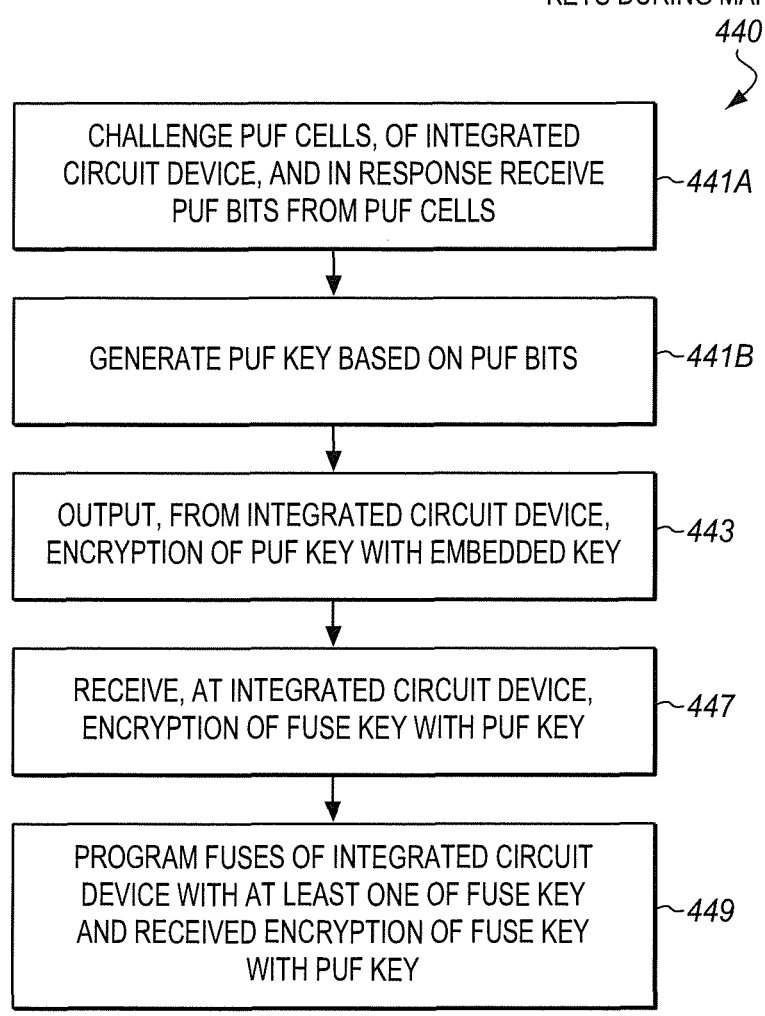
FIG. 4 is a block diagram of an embodiment of a method performed by a device to receive fuse keys.

FIG. 4 is a block diagram of an embodiment of a method 440 performed by a device to receive fuse keys. In some embodiments, the method may be performed by a device in a manufacturing process in order to be provisioned with the fuse keys by a manufacturing system. The method includes challenging a set of PUF cells, of an integrated circuit device, and receiving a set of PUF bits from the PUF cells in response, at block 441A. The method also includes generating a PUF key based on the set of PUF bits, at block 441B. For example, the challenge, receiving the PUF bits in response, and the generating of the PUF key may be similar to or the same as that discussed in conjunction with FIG. 3. The method also includes outputting, from the integrated circuit device, an encryption of the PUF key with an embedded key, at block 443. The method further includes receiving, at the integrated circuit device, an encryption of a fuse key with the PUF key, at block 447. FIGS. 5-10 discuss various different suitable embodiments of ways in which blocks 443 and 447 may be performed. The method also includes programming fuses of the integrated circuit device with at least one of the fuse key and the received encryption of the fuse key with the PUF key, at block 449.

Figure 5:
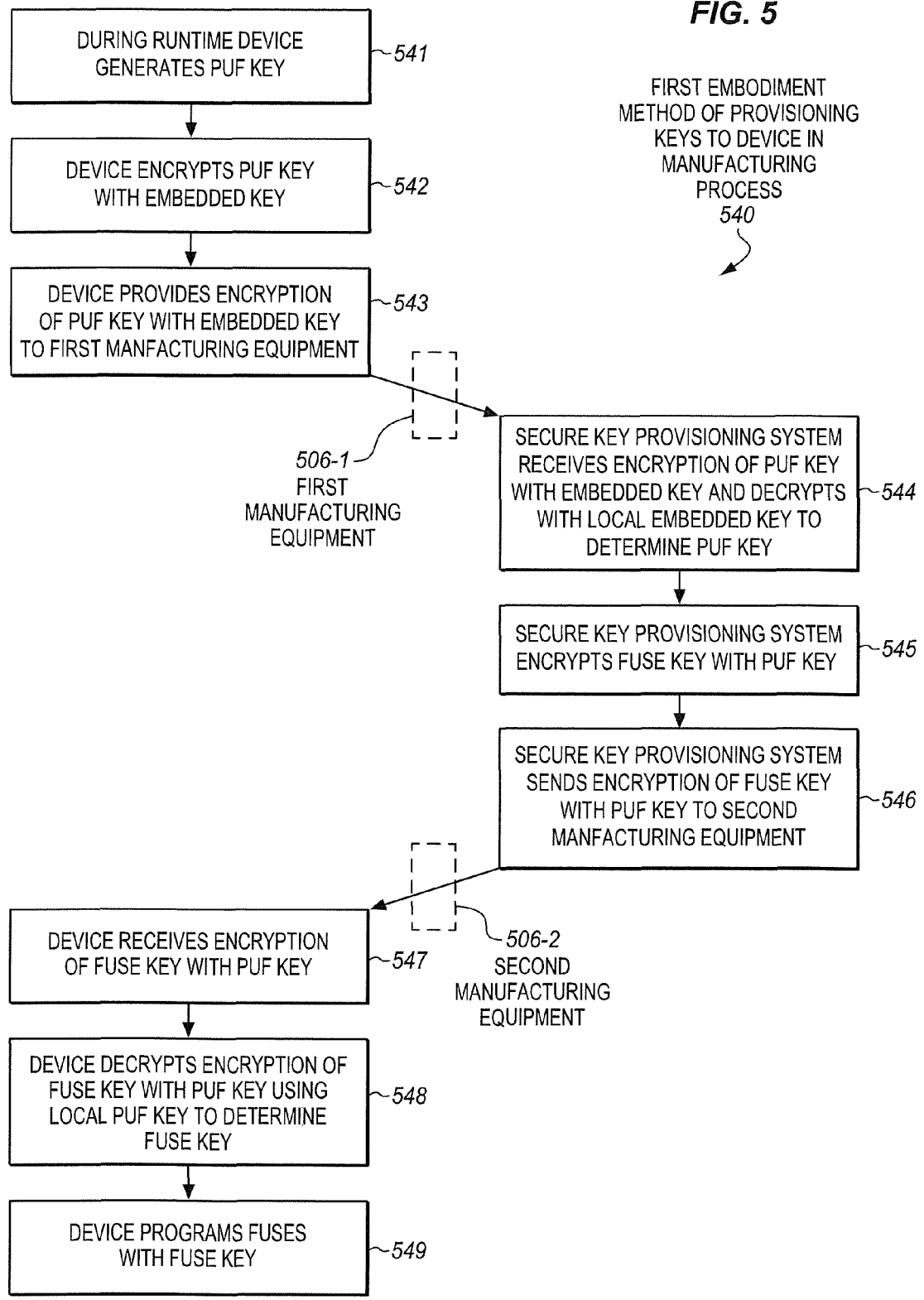
FIG. 5 is a block flow diagram of a first particular embodiment of a method of provisioning keys to a device in a manufacturing process.
Figure 6:
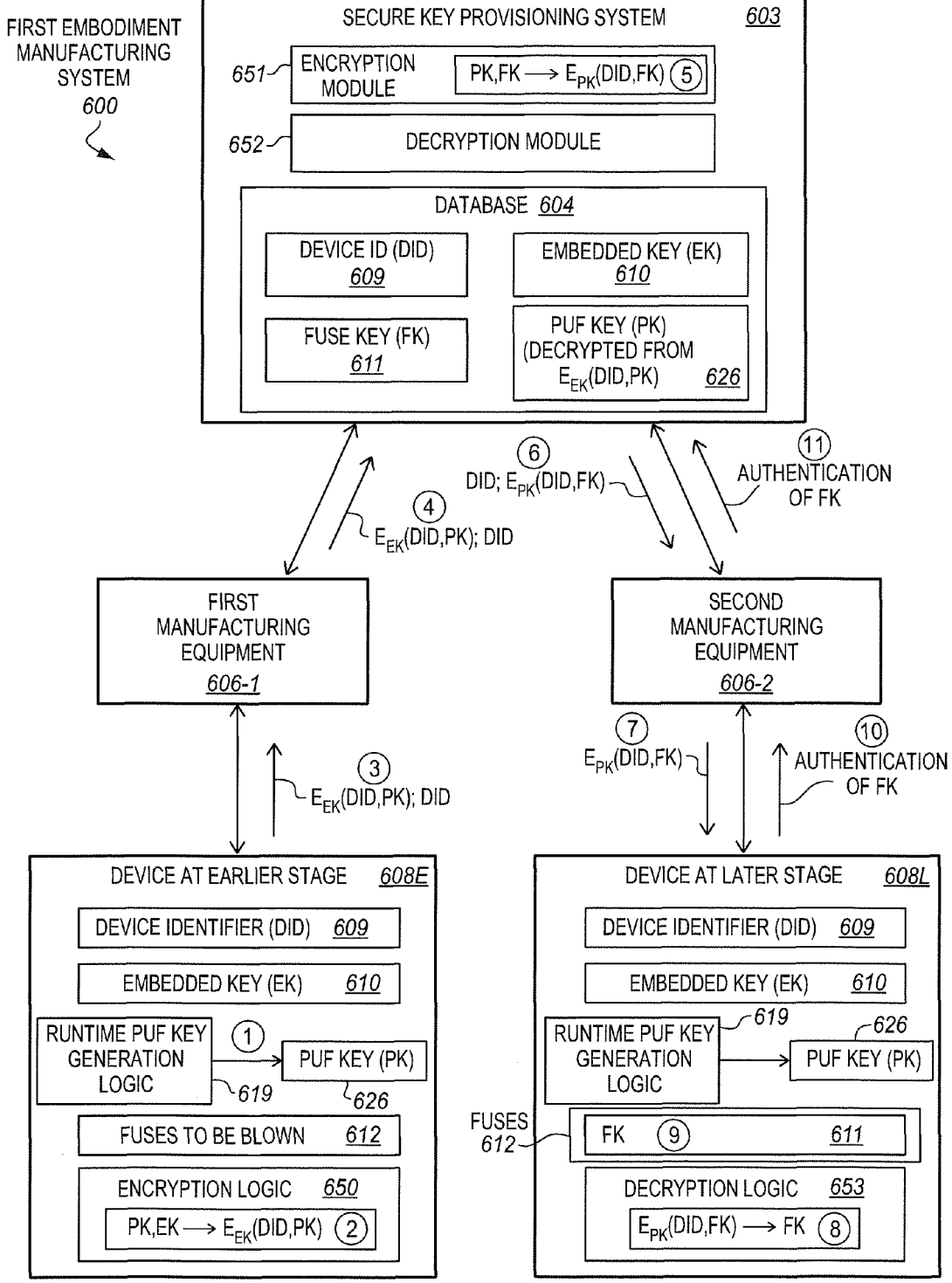
FIG. 6 is a first embodiment of a manufacturing system that is operable to provision keys to a device.

FIG. 5 is a block flow diagram of a first particular embodiment of a method 540 of provisioning keys to a device in a manufacturing process. FIG. 6 is a first embodiment of a manufacturing system 600 that is operable to provision keys to a device 608. To better illustrate certain concepts, and streamline the disclosure, the method 540 of provisioning keys will be described in conjunction with the manufacturing system 600 to provision the keys. However, it is to be appreciated that the manufacturing system 600 may perform either the method 540 or an entirely different method. Moreover, the method 540 may be performed by either the manufacturing system 600 or an entirely different manufacturing system.

Referring to FIG. 5, during runtime the device may generate a PUF key, at block 541. For example, as shown in FIG. 6, at numeral (1) the device 608E at an earlier stage of manufacture may generate a PUF key (PK) 626. The PUF key is generated from runtime PUF key generation logic 619. In one embodiment, the PUF key generation logic 619 may be similar to, or the same as, the PUF key generation logic 319 of FIG. 3. Alternatively, the PUF key may be generated by other approaches known in the arts. By way of example, a first manufacturing equipment 606-1 may turn on the device, and the device may generate PUF bits from PUF cells during runtime. In some embodiments, the PUF key may represent a symmetric key. Advantageously, encryption with a symmetric key generally tends to be relatively fast and efficient (e.g., as compared with many public/private key encryptions). Generally, the PUF key is substantially unique per device (e.g., within the randomness characteristics of the PUF cells).

Referring again to FIG. 5, the device may encrypt the PUF key with an embedded key, at block 542. For example, as shown in FIG. 6, at numeral (2) the device 608E may encrypt the PUF key (PK) 626, and optionally a device identifier (DID) 609, with an embedded key (EK) 610. This is represented in the illustration as $E_{EK}$(DID, PK), where the subscript EK designates that the embedded key (EK) is used to encrypt the data, and where the parenthesis enclose the data encrypted (in this case DID and PK). As shown, the device includes encryption logic 650 to perform the encryption. In other embodiments, the device identifier (DID) may not be part of the encrypted data. In some embodiments, an authenticated encryption approach may be used. Examples of suitable authenticated encryption approaches include, but are not limited to, GCM (Galois/counter mode) encryptions, CCM (counter with cipher block chaining (CCM) message authentication code (MAC)) encryptions, other encryption along with authentication (MAC), and other authentication encryptions known in the arts.

Referring again to FIG. 5, the device may output or provide the encryption of the PUF key with the embedded key to a first manufacturing equipment 506-1, at block 543. The embedded key may have the characteristics previously described (e.g., fixed in the design, not easily reconfigurable, etc.). Commonly, the embedded key is known to very few individuals. The embedded key may be used to encode the PK. For example, as shown in FIG. 6, at numeral (3) the device 608-E may provide the encryption of the PUF key (PK), and optionally the device identifier (DID), with the embedded key (EK) (designated as $E_{EK}$(DID, PK)), to a first manufacturing equipment 606-1 (e.g., a first tester and prober). The device may also provide, along with the encryption, the unencrypted device identifier (DID). By way of example, the first manufacturing equipment may read the device identifier (DID) from the device and send the DID and the encryption $E_{EK}$(DID, PK) to the secure key provisioning system 603. Alternatively, other ways of communicating that the encrypted data corresponds to the device may be used besides sending the device identifier (DID). The DID and encryption $E_{EK}$(DID, PK) may pass through the first manufacturing equipment on its way to the secure key provisioning system.

Referring again to FIG. 5, the secure key provisioning system may receive the encryption of the PUF key with the embedded key, and may decrypt the received encryption with a local embedded key in order to determine the PUF key, at block 544. For example, as shown in FIG. 6, at numeral (4) the secure key provisioning system 603 may receive the encryption of the PUF key (PK), and optionally the device identifier (DID), with the embedded key (EK) (designated as $E_{EK}$(DID, PK) from the first manufacturing equipment. The secure key provisioning system may also optionally receive the unencrypted device identifier (DID). The secure key provisioning system has a database 604. As shown, the database may store the device identifier (DID) 609, the embedded key (EK) 610, and a fuse key (FK) 611 for the device, as well as for other devices being manufactured. The embedded key (EK) in the database may represent a local copy of the embedded key for the device which corresponds to the received device identifier (DID). The local copy of the embedded key may be used to decrypt the received encrypted data. The secure key provisioning system includes a decryption module 652, which may be implemented in hardware, software, firmware, or a combination thereof, to perform the decryption. The decryption allows the PUF key (PK) to be determined. If the device identifier (DID) was sent in encrypted and unencrypted forms, then the secure key provisioning system may compare the decrypted and unencrypted device identifiers (DID) to ensure that the decryption was correct or without errors. The secure key provisioning system may store the determined PUF key (PK) 626 in the database. In the database, the embedded key, the fuse key, and the PUF key may be logically associated with the device 608E through its device identifier.

Referring again to FIG. 5, the secure key provisioning system may encrypt the fuse key with the PUF key, at block 545. For example, as shown in FIG. 6, at numeral (5) the secure key provisioning system may encrypt the fuse key (FK) 611, and optionally the device identifier (DID) 609, with the PUF key (PK) 626 (designated as $E_{EK}$(DID, FK)). The fuse key corresponding to the device may be accessed from the database, for example using the device identifier for the device to look up the appropriate fuse key. In another embodiment, the device identifier need not be included in the encrypted data. The secure key provisioning system includes an encryption module 651, which may be implemented in hardware, software, firmware, or a combination thereof, to perform the encryption. In some embodiments, an authenticated encryption method may be used. The aforementioned types of authenticated encryption, or other types of encryption known in the art, may be used.

Referring again to FIG. 5, the secure key provisioning system may transmit, send, or otherwise provide the encryption of the fuse key with the PUF key to a second manufacturing equipment 506-2, at block 546. For example, as shown in FIG. 6, at numeral (6) the secure key provisioning system 603 may provide the encryption of the fuse key (FK), and optionally the device identifier (DID), with the PUF key (PK) (designated as $E_{PK}$(DID, FK)), to a second manufacturing equipment 606-2. The secure key provisioning system may also optionally provide, along with the encryption, the unencrypted device identifier (DID). By way of example, the second manufacturing equipment may read the device identifier (DID) from the device 608L at a later stage of manufacture and may send a request with the read DID to the secure key provisioning system. In response to and/or after receiving the request, the secure key provisioning system may send the encrypted data $E_{PK}$(DID, FK) and the corresponding device identifier (DID) to the second manufacturing equipment. Alternatively, other ways of communicating or coordinating that the encrypted data corresponds to the device may be used besides sending the device identifier (DID) along with the encryption. The DID and the encrypted data $E_{PK}$(DID, FK) may pass through the second manufacturing equipment to the device 608L at the later stage of manufacture.

In some embodiments, the second manufacturing equipment 606-2 may potentially be at a different, later stage of manufacture than the first manufacturing equipment 606-1. For example, in one embodiment, the second manufacturing equipment may be located at an assembly stage of manufacture or another stage of manufacture where fuses are commonly programmed. The terms "later" and "earlier" are used herein as relative terms (i.e., relative to each other) not absolute terms. In some embodiments, the second manufacturing equipment may potentially be different manufacturing equipment (e.g., a different tester and prober) than the first manufacturing equipment, although this is not required. The second manufacturing equipment may potentially be operated by a different operator or employee than the first manufacturing equipment. In some cases, the first and second manufacturing equipment may reside in different facilities (e.g., buildings) and/or different geographical locations.

Referring again to FIG. 5, the device may receive the encryption of the fuse key with the PUF key, at block 547. For example, as shown in FIG. 6, at numeral (7) the device may receive the encryption of the fuse key (FK), and optionally the device identifier (DID), with the PUF key (PK) (designated as $E_{PK}$(DID, FK)) from the second manufacturing equipment. The device may also optionally receive the unencrypted device identifier (DID).

Referring again to FIG. 5, the device may decrypt the encryption of the fuse key with the PUF key using a local PUF key to determine the fuse key, at block 548. For example, as shown in FIG. 6, at numeral (8) the device 608L may decrypt the received encrypted data $E_{PK}$(DID, FK) using a PUF key that is generated locally during runtime from PUF cells. The PUF key may be generated substantially as previously shown and described in conjunction with the description of block 541. Generally the PUF key will not be stored in memory within the device, but rather will be regenerated each time it is needed (e.g., by providing a challenge to PUF cells and using a response from the PUF cells). The device includes a decryption logic 653, which may be implemented in hardware, software, firmware, or a combination thereof, to perform the decryption. The decryption allows the fuse key (FK) to be determined.

Referring again to FIG. 5, the device may burn, program, or otherwise write fuses with the determined fuse key, at block 549. For example, as shown in FIG. 6, at numeral (9) the device 608L may program or write a fuse key 611 to the fuses 612. This may be performed in a substantially conventional manner.

Referring again to FIG. 5, in the illustrated embodiment, at block 548 the device decrypted the encryption of the fuse key with the PUF key using the local PUF key to determine the fuse key, and then at block 549 programmed the fuses with the fuse key. In another embodiment, the device may instead program the fuses with the received encrypted data (e.g., $E_{PK}$(DID, FK)), and may subsequently (e.g., when the fuse key is needed for security) access the encrypted data programmed in the fuses and decrypt the encrypted data using the locally generated PUF key to determine the fuse key. That is, either the fuse key itself, or the received encryption of the fuse key, may be programmed into the fuses.

Some embodiments allow a secure key provisioning system to verify the integrity of the fuse key as received by the device. Referring to FIG. 6, at numeral (10) the device 608L provides an authentication of the fuse key (FK) to the second manufacturing equipment. At numeral (11) the second manufacturing equipment provides the received authentication of the fuse key (FK) to the secure key provisioning system. The authentication of the fuse key may be either an authentication of the fuse key directly or an authentication of an encryption of the fuse key (e.g., $E_{PK}$(DID, FK)). In some embodiments, the authentication may be a hash. For example, the authentication may be a hash of the fuse key (FK), or a hash of an encryption of the fuse key (e.g., a hash of $E_{PK}$(DID, FK)). In other embodiments, the authentication may be Message Authentication Code (MAC) using another key, such as, for example, the embedded key (EK) or the PUF key (PK). For example, the authentication may be a MAC of the fuse key (FK), or a MAC of an encryption of the fuse key (e.g., a MAC of $E_{PK}$(DID, FK)), using another key, such as, for example, the embedded key (EK) or the PUF key (PK). The secure key provisioning system may receive the authentication. The secure key provisioning system may compute the hash using the same hash function or the MAC using the same MAC function using its version of the fuse key (FK) or its version of the encryption of the fuse key, whichever is appropriate. If the hash or the MAC computed by the secure key generation system matches the received hash or the received MAC, then the fuse key or the encryption of the fuse key may be validated. Alternatively, if they don't match, then the authentication is not confirmed and the error or problem should be resolved before the devices fuses are programmed with potentially erroneously received data. Such authentication, while often beneficial, is not required for embodiments of the invention.

Advantageously, the method 540 of FIG. 5 and/or the manufacturing system 600 of FIG. 6 generally tend to provide enhanced security in provisioning keys as compared to the approach shown and described in conjunction with FIG. 2. Recall that in the approach of FIG. 2, since the fused keys (FK) are encrypted with the embedded key (EK), if the embedded key (EK) could be obtained (e.g., through reverse engineering), and the manufacturing equipment 206 could be corrupted (e.g., by installation of a corrupt test program) to determine or store the encryption of the fuse key (FK) with the embedded key (EK) (e.g., $E_{EK}$(DID, FK)), then the fuse key (FK) could be obtained. However, in the approach of FIGS. 5-6, the first manufacturing equipment 606-1 only has access to the encryption of the PUF key (PK) with the embedded key (EK), for example $E_{EK}$(DID, PK). The second manufacturing equipment 606-2 only has access to the encryption of the fuse key (FK) with the PUF key (PK), for example $E_{EK}$(DID, FK). The fuse keys could generally only be determined by determination of the embedded key (e.g., through reverse engineering) together with corruption of both the first and the second manufacturing equipment 606-1, 606-2. However, corrupting both the first and the second manufacturing equipment 606-1, 606-2 generally tends to be substantially more difficult than corrupting the single manufacturing equipment 206. Typically, the first and the second manufacturing equipment 606-1, 606-2 are run by different operators, often in different portions of a facility (e.g., different buildings), or in some cases even at different geographical locations. Thus, multiple operators or employees would generally need to cooperate to successfully determine the fuse key.

Figure 7:
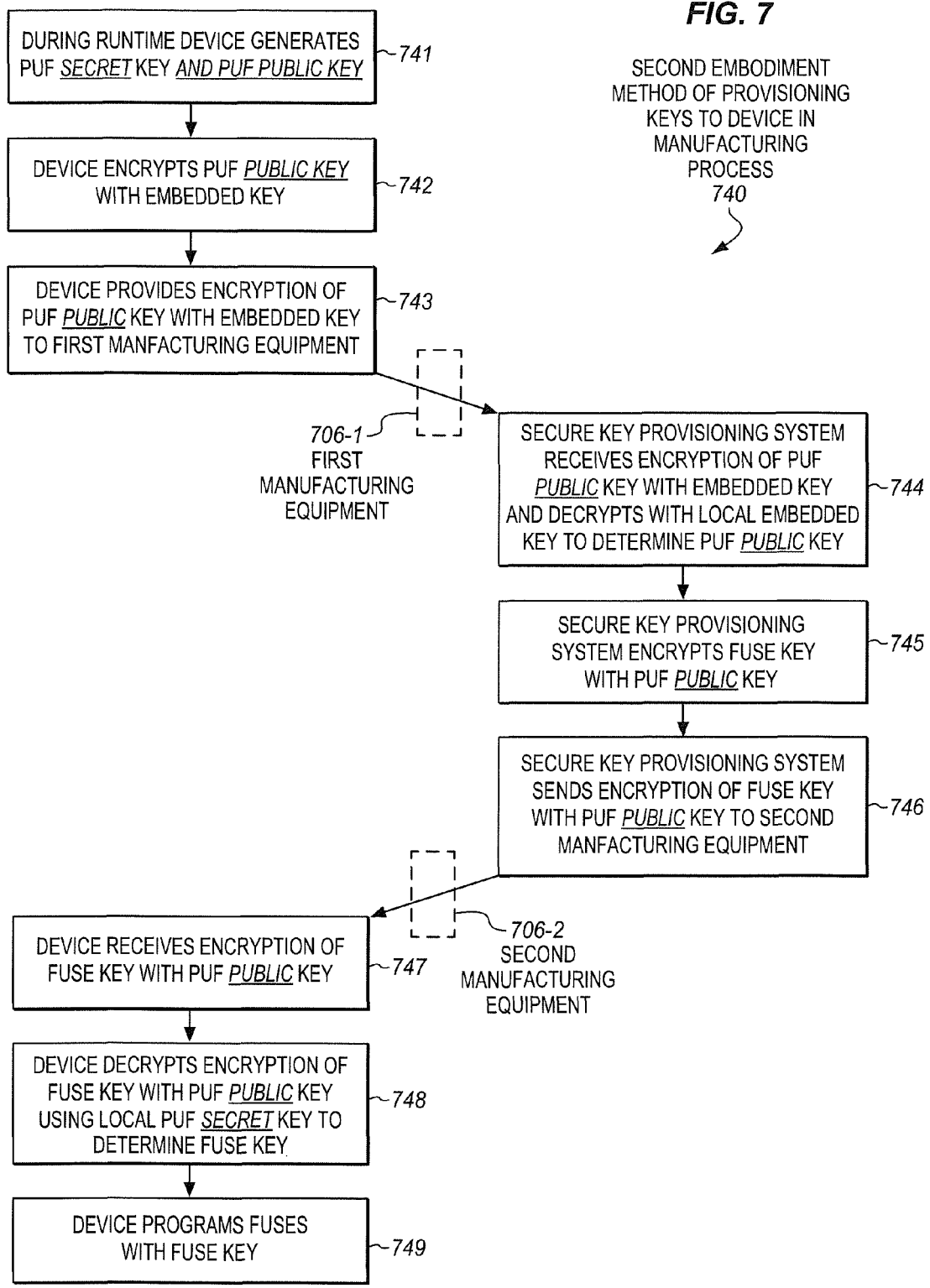
FIG. 7 is a block flow diagram of a second particular embodiment of a method of provisioning keys to a device in a manufacturing process.
Figure 8:
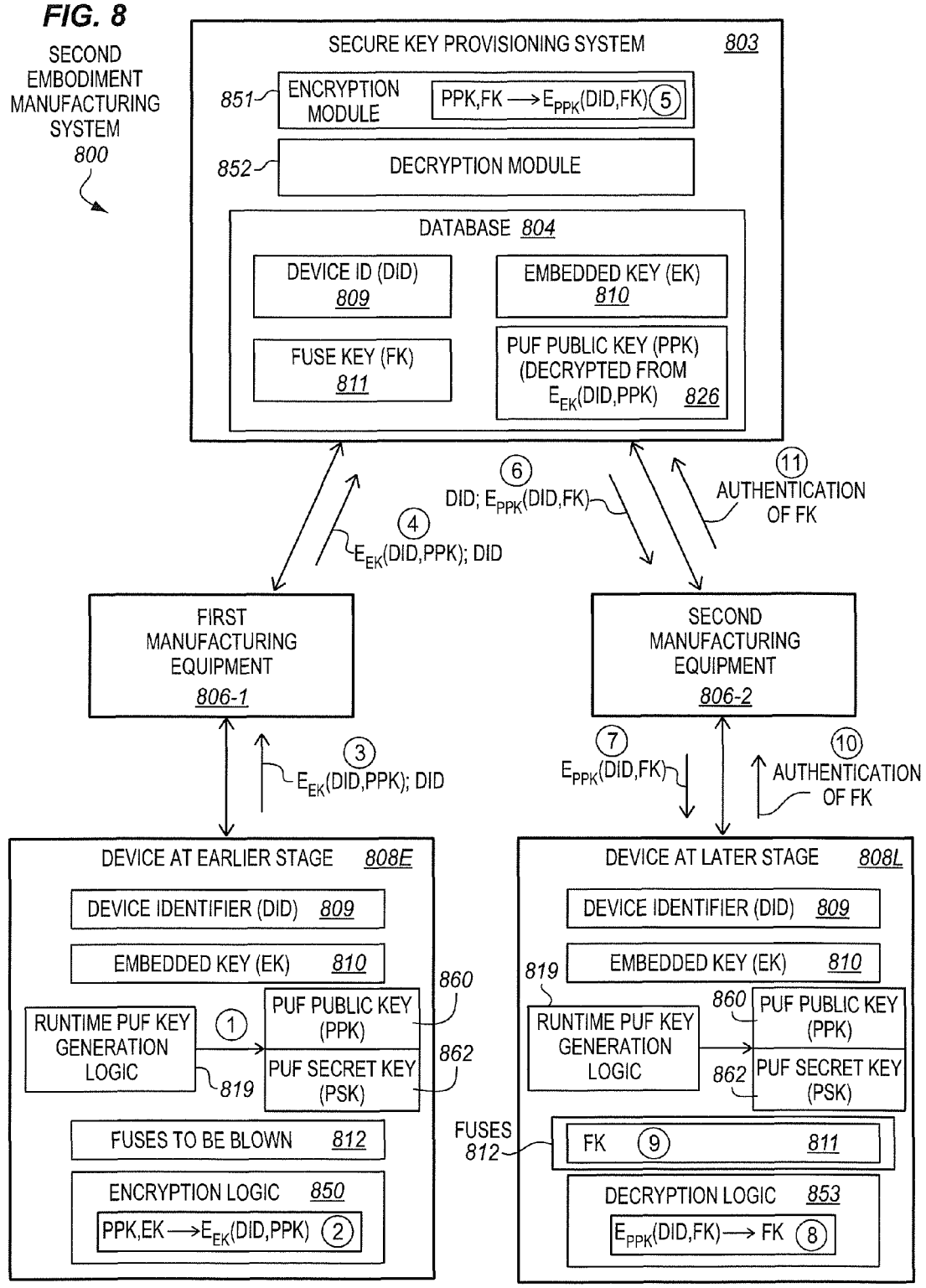
FIG. 8 is a second embodiment of a manufacturing system that is operable to provision keys to a device.

FIG. 7 is a block flow diagram of a second particular embodiment of a method 740 of provisioning keys to a device in a manufacturing process. FIG. 8 is a second embodiment of a manufacturing system 800 that is operable to provision keys to a device 808. To better illustrate certain concepts, and streamline the disclosure, the method 740 of provisioning keys will be described in conjunction with the manufacturing system 800 to provision the keys. However, it is to be appreciated that the manufacturing system 800 may perform either the method 740 or an entirely different method. Moreover, the method 740 may be performed by either the manufacturing system 800 or an entirely different manufacturing system. The method 740 and the manufacturing system 800 have similarities, respectively, to the method 540 of FIG. 5 and the manufacturing system 600 of FIG. 6, and may optionally have many of the same or similar characteristics. To avoid obscuring the description, the discussion below will tend to emphasize the different or additional characteristics of the method 740 and the manufacturing system 800, rather than repeating all of the characteristics which may be the same or similar. However, it is to be understood that the characteristics disclosed elsewhere herein may also apply to the method 740 and the manufacturing system 800.

Referring to FIG. 7, during runtime the device may generate a PUF secret key and a PUF public key, at block 741. For example, as shown in FIG. 8, at numeral (1) the device 808E at an earlier stage of manufacture may generate a PUF public key (PPK) 860 and a PUF secret key (PSK) 862. These keys may be generated from runtime PUF key generation logic 819. In one embodiment, the PUF key generation logic 819 may include logic that is similar to, or the same as, the PUF key generation logic 319 of FIG. 3. In addition, the PUF key generation logic 819 may also include logic to generate the PUF public/secret key pair. For example, the PUF secret key may be generated first, and the PUF secret key may be used to generate the PUF public key. This may be done in different ways depending upon the particular encryption scheme. In some cases, PUF bits or a key generated from the PUF bits may be used as the PUF secret key. The PUF secret key may represent a random or near random value. The PUF public key may be generated from the PUF secret key using the selected encryption/key generation algorithm. In other cases (e.g., in RSA), PUF bits, or the like, may be used as or to generate a static seed value. The PUF public key and the PUF secret key may be generated from the static seed value using the selected encryption/key generation algorithm. The PUF public/secret key pair may be substantially unique per device, at least within the randomness characteristics of the PUF cells.

Referring again to FIG. 7, the device may encrypt the PUF public key with an embedded key, at block 742. For example, as shown in FIG. 8, at numeral (2) the device 808E may encrypt the PUF public key (PPK) 860, and optionally a device identifier (DID) 809, with an embedded key (EK) 810. This is represented in the illustration as $E_{EK}$(DID, PPK). As shown, the device includes encryption logic 850 to perform the encryption. In other embodiments, the device identifier (DID) may not be part of the encrypted data. The same encryption approaches previously described above for block 542, or substitutes for these approaches known in the arts, may optionally be used.

Referring again to FIG. 7, the device may output or provide the encryption of the PUF public key with the embedded key to a first manufacturing equipment 706-1, at block 743. For example, as shown in FIG. 8, at numeral (3) the device 808E may provide the encryption of the PUF public key (PPK), and optionally the device identifier (DID), with the embedded key (EK) (designated as $E_{EK}$(DID, PPK)), to a first manufacturing equipment 806-1. The device may also provide, along with the encryption, the unencrypted device identifier (DID).

Referring again to FIG. 7, the secure key provisioning system may receive the encryption of the PUF public key with the embedded key, and may decrypt the received encryption with a local embedded key in order to determine the PUF public key, at block 744. For example, as shown in FIG. 8, at numeral (4) the secure key provisioning system 803 may receive the encryption of the PUF public key (PPK), and optionally the device identifier (DID), with the embedded key (EK) (designated as $E_{EK}$(DID, PPK)) from the first manufacturing equipment. The secure key provisioning system may also optionally receive the unencrypted device identifier (DID). The secure key provisioning system has a database 804. As shown, the database may store the device identifier (DID) 809, the embedded key (EK) 810, and a fuse key (FK) 811 for the device, as well as for other devices being manufactured. The local embedded key may be used to decrypt the received encrypted data. The secure key provisioning system includes a decryption module 852 to perform the decryption. The decryption allows the PUF public key (PPK) to be determined. The secure key provisioning system may store the determined PUF public key (PPK) 862 in the database.

Referring again to FIG. 7, the secure key provisioning system may encrypt the fuse key with the PUF public key, at block 745. For example, as shown in FIG. 8, at numeral (5) the secure key provisioning system may encrypt the fuse key (FK) 811, and optionally the device identifier (DID) 809, with the PUF public key (PPK) 860 (designated as $E_{PPK}$(DID, FK)). In another embodiment, the device identifier need not be included in the encrypted data. The secure key provisioning system includes an encryption module 851 to perform the encryption. In some embodiments, a public key encryption approach may be used. Examples of suitable public key encryption approaches include, but are not limited to, RSA (Ron Rivest, Adi Shamir and Leonard Adleman), ElGamal, elliptic curve (EC) ElGamal, Cramer-Shoup based approaches, and the like, and substitutes for these approaches known in the arts.

Referring again to FIG. 7, the secure key provisioning system may transmit, send, or otherwise provide the encryption of the fuse key with the PUF public key to a second manufacturing equipment 706-2, at block 746. For example, as shown in FIG. 8, at numeral (6) the secure key provisioning system 803 may provide the encryption of the fuse key (FK), and optionally the device identifier (DID), with the PUF public key (PPK) (designated as $E_{PPK}$(DID, FK)), to a second manufacturing equipment 806-2. The unencrypted device identifier (DID) may also optionally be provided. As before, in some embodiments, the second manufacturing equipment 806-2 may potentially be at a different, later stage of manufacture than the first manufacturing equipment 806-1 and/or may potentially be different equipment.

Referring again to FIG. 7, the device may receive the encryption of the fuse key with the PUF public key, at block 747. For example, as shown in FIG. 8, at numeral (7) the device may receive the encryption of the fuse key (FK), and optionally the device identifier (DID), with the PUF public key (PPK) (designated as $E_{PPK}$(DID, FK)) from the second manufacturing equipment. The device may or may not also optionally receive the unencrypted device identifier (DID).

Referring again to FIG. 7, the device may decrypt the encryption of the fuse key with the PUF public key using a local PUF secret key to determine the fuse key, at block 748. For example, as shown in FIG. 8, at numeral (8) the device 808L may decrypt the received encrypted data $E_{PPK}$(DID, FK) using the local PUF secret key (PSK) 862. As previously mentioned, the PUF secret key may be based on PUF bits generated locally during runtime from PUF cells. The device includes decryption logic 853 to perform the decryption. The decryption allows the fuse key (FK) to be determined.

Referring again to FIG. 7, the device may burn, program, or otherwise write fuses with the determined fuse key, at block 749. For example, as shown in FIG. 8, at numeral (9) the device 808L may program or write a fuse key 811 to the fuses 812. In another embodiment, the device may instead program the fuses with the received encrypted data (e.g., $E_{PPK}$(DID, FK)), and may subsequently (e.g., when the fuse key is needed for security) access the encrypted data programmed in the fuses and decrypt the encrypted data using the local PUF secret key to determine the fuse key.

Some embodiments allow a secure key provisioning system to verify the integrity of the fuse key as received by the device. Referring to FIG. 8, at numeral (10) the device 808L may provide an authentication of the fuse key (FK) to the second manufacturing equipment. At numeral (11) the second manufacturing equipment may provide the received authentication of the fuse key (FK) to the secure key provisioning system. Such authentications may be performed substantially as previously described (e.g., in conjunction with numerals (10) and (11) of FIG. 6).

Advantageously, the method 740 of FIG. 7 and/or the manufacturing system 800 of FIG. 8 generally tend to be more secure in provisioning keys as compared to the approach shown and described in conjunction with FIG. 2. In the approach of FIGS. 7-8, even if the embedded key were determined (e.g., through reverse engineering), and even if both the first and the second manufacturing equipment 806-1, 806-2 were corrupted to allow $E_{EK}$(DID, PPK) and $E_{PPK}$(DID, FK) to be determined, the fuse key (FK) still may not be able to be determined. Rather, the PUF secret key (PSK) is only known within the device. However, one potential drawback to the method 740 and/or the manufacturing system 800 is that implementation of public key cryptography, for example key generation and decryption, tends to be relatively time and computation intensive.

Figure 9:
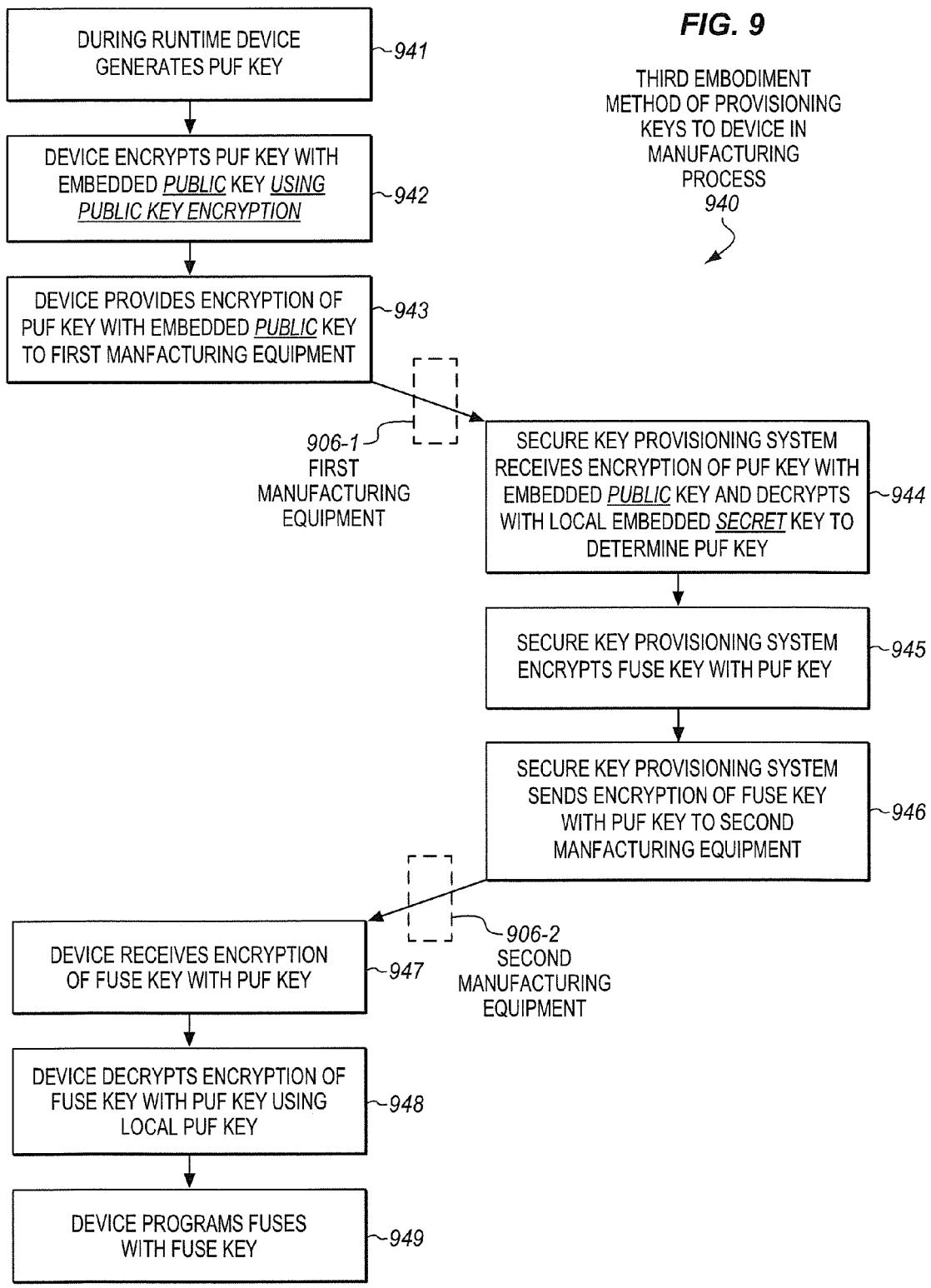
FIG. 9 is a block flow diagram of a third particular embodiment of a method of provisioning keys to a device in a manufacturing process.
Figure 10:
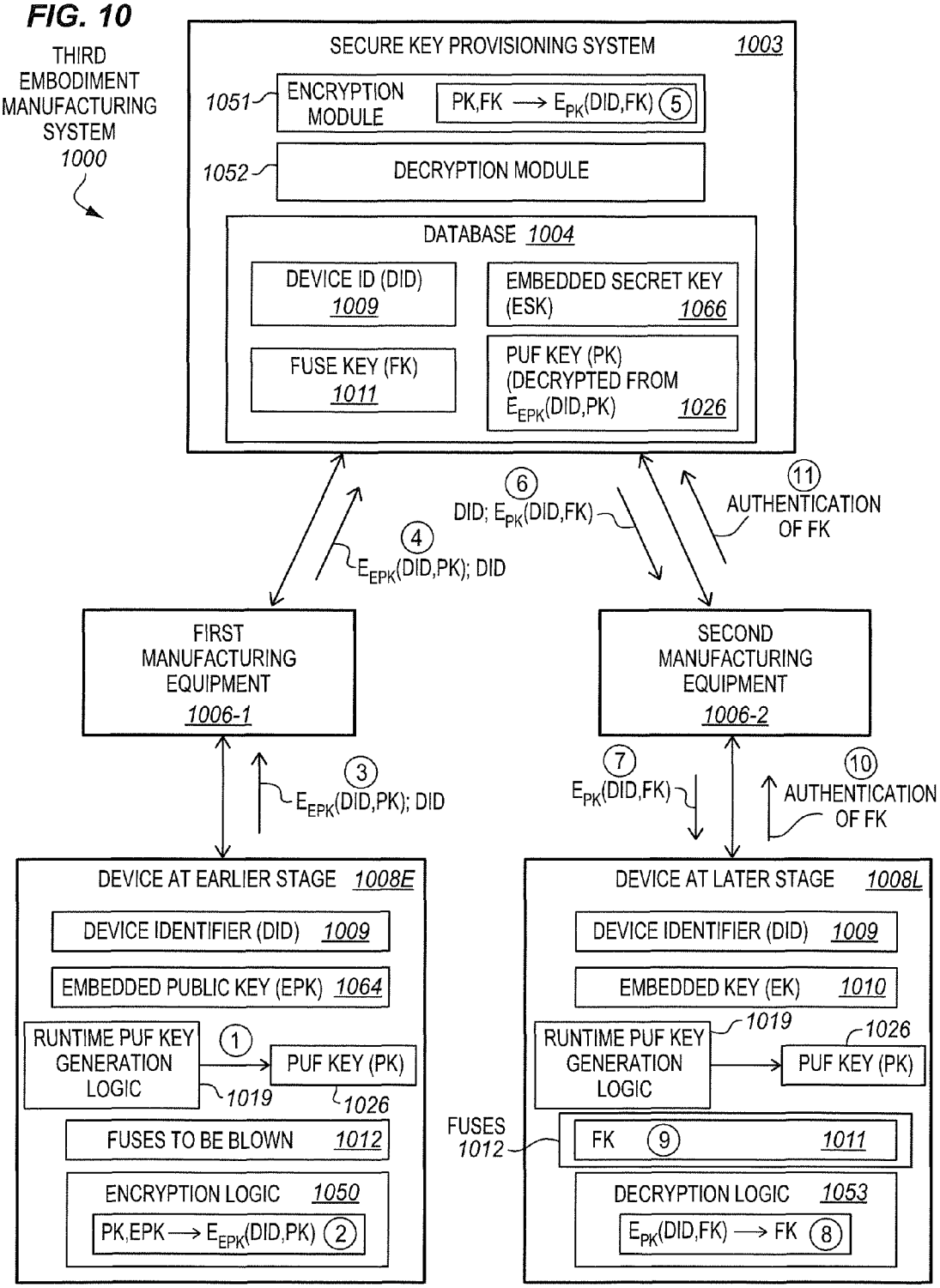
FIG. 10 is a third embodiment of a manufacturing system that is operable to provision keys to a device.

FIG. 9 is a block flow diagram of a third particular embodiment of a method 940 of provisioning keys to a device in a manufacturing process. FIG. 10 is a third embodiment of a manufacturing system 1000 that is operable to provision keys to a device 1008. To better illustrate certain concepts, and streamline the disclosure, the method 940 of provisioning keys will be described in conjunction with the manufacturing system 1000 to provision the keys. However, it is to be appreciated that the manufacturing system 1000 may perform either the method 940 or an entirely different method. Moreover, the method 940 may be performed by either the manufacturing system 1000 or an entirely different manufacturing system. The method 940 and the manufacturing system 1000 have similarities, respectively, to the method 540 of FIG. 5 and the manufacturing system 600 of FIG. 6, and/or to the method 740 of FIG. 7 and the manufacturing system 800 of FIG. 8, and may optionally have many of the same or similar characteristics. To avoid obscuring the description, the discussion below will tend to emphasize the different or additional characteristics of the method 940 and the manufacturing system 1000, rather than repeating all of the characteristics which may be the same or similar. However, it is to be understood that the characteristics disclosed elsewhere herein may also apply to the method 940 and the manufacturing system 1000.

Referring to FIG. 9, during runtime the device may generate a PUF key, at block 941. For example, as shown in FIG. 10, at numeral (1) the device 1008E at an earlier stage of manufacture may generate a PUF key (PK) 1026. The PUF key is generated from runtime PUF key generation logic 1019. In one embodiment, the PUF key generation logic 1019 may be similar to, or the same as, the PUF key generation logic 319 of FIG. 3. Alternatively, the PUF key may be generated by other approaches known in the arts. By way of example, a first manufacturing equipment 1006-1 may turn on the device, and the device may generate PUF bits from PUF cells during runtime. In some embodiments, the PUF bits may be used as the PUF key and/or to generate the PUF key (e.g., by PUF based key generation logic 325).

Referring again to FIG. 9, the device may encrypt the PUF key with an embedded public key using pubic key encryption, at block 942. For example, as shown in FIG. 10, at numeral (2) the device 1008E may encrypt the PUF key (PK) 1026, and optionally a device identifier (DID) 1009, with an embedded public key (EPK) 1064. The EPK may be embedded and may be fixed in the design of the part similar to the aforementioned embedded keys and not changeable without a design change. This is represented in the illustration as $E_{EPK}(DID, PK)$. Notice that the secure key provisioning system includes a corresponding embedded secret key (ESK) 1066 that together form a public-secret key pair. Secret keys are also sometimes referred to in the arts as private keys. In some embodiments, a public key encryption approach may be used. The previously mentioned types or substitutes for those types known in the arts are suitable. In one particular example embodiment, the device may use RSA encryption with a small prime (e.g., 3 or 17) as the embedded public key. Implementing such RSA encryption generally tends to be less resource and/or time intensive than implementing PUF public key generation and decryption using the approach shown in FIGS. 7-8 but still tends to be more resource and/or time intensive than the approach shown in FIGS. 5-6. The cost of the encryption may potentially be reduced by utilizing other efficient RSA implementation logic of the device. As shown, the device includes encryption logic 1050 to perform the encryption. In other embodiments, the device identifier (DID) may not be part of the encrypted data.

Referring again to FIG. 9, the device may output or provide the encryption of the PUF key with the embedded public key to a first manufacturing equipment 906-1, at block 943. For example, as shown in FIG. 10, at numeral (3) the device 1008E may provide the encryption of the PUF key (PK), and optionally the device identifier (DID), with the embedded public key (EPK) (designated as $E_{EPK}(DID, PK)$), to a first manufacturing equipment 1006-1. The device may also optionally provide, along with the encryption, the unencrypted device identifier (DID).

Public key encryption often does not provide authentication in the way that an authenticating encryption does. In some embodiments, the device 1008E may also optionally provide an authentication message to the first manufacturing equipment 1006-1 around the same time that the encrypted data (e.g., as $E_{EPK}(DID, PK)$) is provided to authenticate the PUF key (PK) 1026. As one example, the authentication may include a hash of the PUF key 1026. As another example, the authentication may include a message authentication code (MAC) of the PUF key 1026 with another key, such as, for example, an embedded key 610 or the PUF key 1026. One particular example of such a MAC is $MAC_{EK}(DID, PK)$.

Referring again to FIG. 9, the secure key provisioning system may receive the encryption of the PUF key with the embedded public key, and may decrypt the received encryption with a local embedded secret key in order to determine the PUF public key, at block 944. For example, as shown in FIG. 10, at numeral (4) the secure key provisioning system 1003 may receive the encryption of the PUF key (PK), and optionally the device identifier (DID), with the embedded public key (EPK) (designated as $E_{EPK}(DID, PK)$ from the first manufacturing equipment. The secure key provisioning system may also optionally receive the unencrypted device identifier (DID). The secure key provisioning system has a database 1004. As shown, the database may store the device identifier (DID) 1009, the embedded secret key (EK) 1010, and a fuse key (FK) 1011 for the device, as well as for other devices being manufactured. In some embodiments, the database may optionally also store copies of embedded public keys (e.g., embedded public key (EPK) 1064). The local embedded secret key (ESK) 1066 may be used to decrypt the received encrypted data. The secure key provisioning system includes a decryption module 1052 to perform the decryption. The decryption allows the PUF key (PK) to be determined. The secure key provisioning system may store the determined PUF key (PK) 1026 in the database.

In embodiments where an authentication message was also optionally provided from the device to authenticate the PUF key, the secure key provisioning system may optionally use the authentication message to authenticate the received PUF key. For example, the secure key provisioning system may compute a hash of the received PUF key using the same hash function as was used by the device to generate the authentication message. As another example, the secure key provisioning system may compute a MAC of the PUF using the same MAC approach as was used by the device to generate the authentication message.

Referring again to FIG. 9, the secure key provisioning system may encrypt the fuse key with the PUF key, at block 945. For example, as shown in FIG. 10, at numeral (5) the secure key provisioning system may encrypt the fuse key (FK) 1011, and optionally the device identifier (DID) 1009, with the PUF key (PK) 1026 (designated as $E_{PK}(DID, FK)$). In another embodiment, the device identifier need not be included in the encrypted data. The secure key provisioning system includes an encryption module 1051 to perform the encryption. In some embodiments, an authenticated encryption method may be used. The aforementioned types of authenticated encryption, or substitutes for these approaches known in the art, may be used.

Referring again to FIG. 9, the secure key provisioning system may transmit, send, or otherwise provide the encryption of the fuse key with the PUF key to a second manufacturing equipment 906-2, at block 946. For example, as shown in FIG. 10, at numeral (6) the secure key provisioning system 1003 may provide the encryption of the fuse key (FK), and optionally the device identifier (DID), with the PUF key (PK) (designated as $E_{PK}(DID, FK)$), to a second manufacturing equipment 1006-2. The unencrypted device identifier (DID) may also optionally be provided. As before, in some embodiments, the second manufacturing equipment 1006-2 may potentially be at a different, later stage of manufacture than the first manufacturing equipment 1006-1 and/or may potentially be different equipment.

Referring again to FIG. 9, the device may receive the encryption of the fuse key with the PUF key, at block 947. For example, as shown in FIG. 10, at numeral (7) the device may receive the encryption of the fuse key (FK), and optionally the device identifier (DID), with the PUF key (PK) (designated as $E_{PK}(DID, FK)$) from the second manufacturing equipment. The device may or may not also optionally receive the unencrypted device identifier (DID).

Referring again to FIG. 9, the device may decrypt the encryption of the fuse key with the PUF public key using a local PUF key to determine the fuse key, at block 948. For example, as shown in FIG. 10, at numeral (8) the device 1008L may decrypt the received encrypted data $E_{PK}(DID, FK)$ using the local PUF key (PK) 1026. In some embodiments, the local PUF key 1026 may be regenerated during runtime by providing a challenge to PUF cells, receiving PUF bits output from the PUF cells, and optionally performing other operations. The device includes decryption logic 1053 to perform the decryption. The decryption allows the fuse key (FK) to be determined.

Referring again to FIG. 9, the device may burn, program, or otherwise write fuses with the determined fuse key, at block 949. For example, as shown in FIG. 10, at numeral (9) the device 1008L may program or write a fuse key 1011 to the fuses 1012. In another embodiment, the device may instead program the fuses with the received encrypted data (e.g., $E_{PK}(DID, FK)$), and may subsequently (e.g., when the fuse key is needed for security) access the encrypted data programmed in the fuses and decrypt the encrypted data using the local PUF key to determine the fuse key.

As before, some embodiments allow a secure key provisioning system to verify the integrity of the fuse key as received by the device. Referring to FIG. 10, at numeral (10) the device 1008L may provide an authentication of the fuse key (FK) to the second manufacturing equipment. At numeral (11) the second manufacturing equipment may provide the received authentication of the fuse key (FK) to the secure key provisioning system. Such authentications may be performed substantially as previously described (e.g., in conjunction with numerals (10) and (11) of FIG. 6).

Advantageously, the method 940 of FIG. 9 and/or the manufacturing system 1000 of FIG. 10 generally tend to be more secure in provisioning keys as compared to the approach shown and described in conjunction with FIG. 2. For example, a "part spoofing attack" where an attacker extracts a GK from the part, and then sends a transaction off to the keyserver pretending to be a valid part asking for a key, may receive a key, but will not be able to get access to keys that were sent to other parts. In other words, in the other approach with GK, and observing all the traffic between the device and the key server at both operation points, one can get all the PK's and therefore all the FK's due in part to the use of symmetric cryptography. However, in the present approach of FIGS. 9-10, with GK and EPK an attacker may ask the server for a part, and receive one, but even with all the traffic going to all the other parts, and GK and EPK, the attacker can't figure out what the PK or FK of other devices are due in part to the use of asymmetric cryptography.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB)

1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 12B:
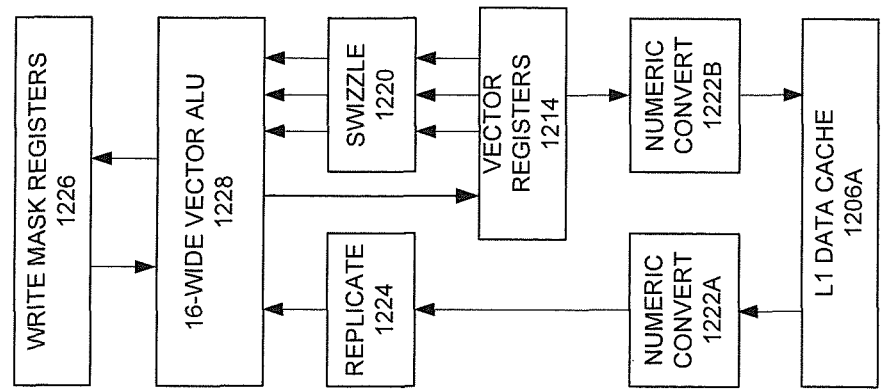
FIGS. 12A-B illustrate a block diagram of a more specific exemplary in-order core architecture, which core would be one of several logic blocks (including other cores of the same type and/or different types) in a chip.
Figure 12A:
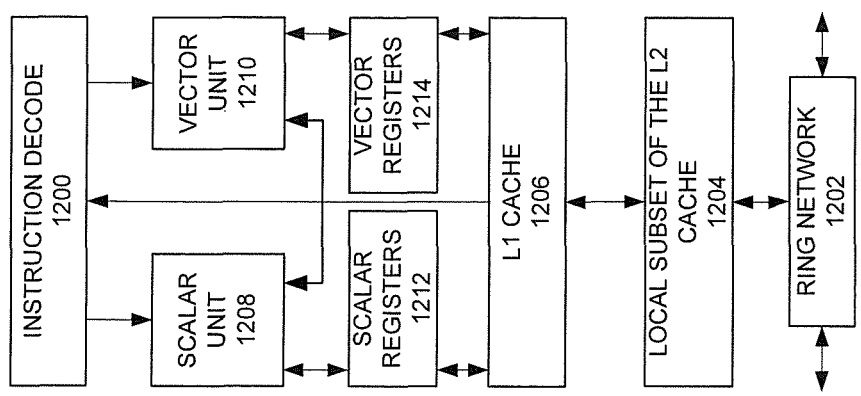

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Processor with Integrated Memory Controller and Graphics

Figure 13:
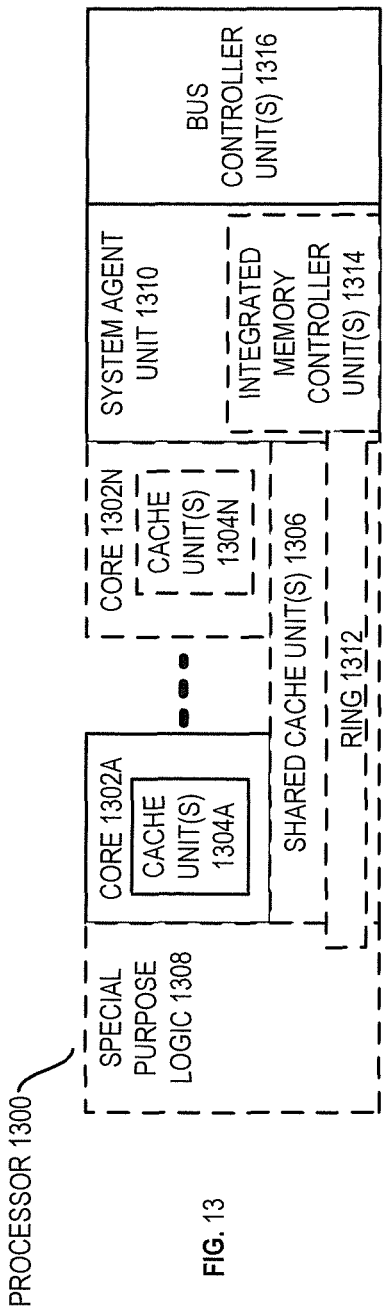
FIG. 13 is a block diagram of a processor that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
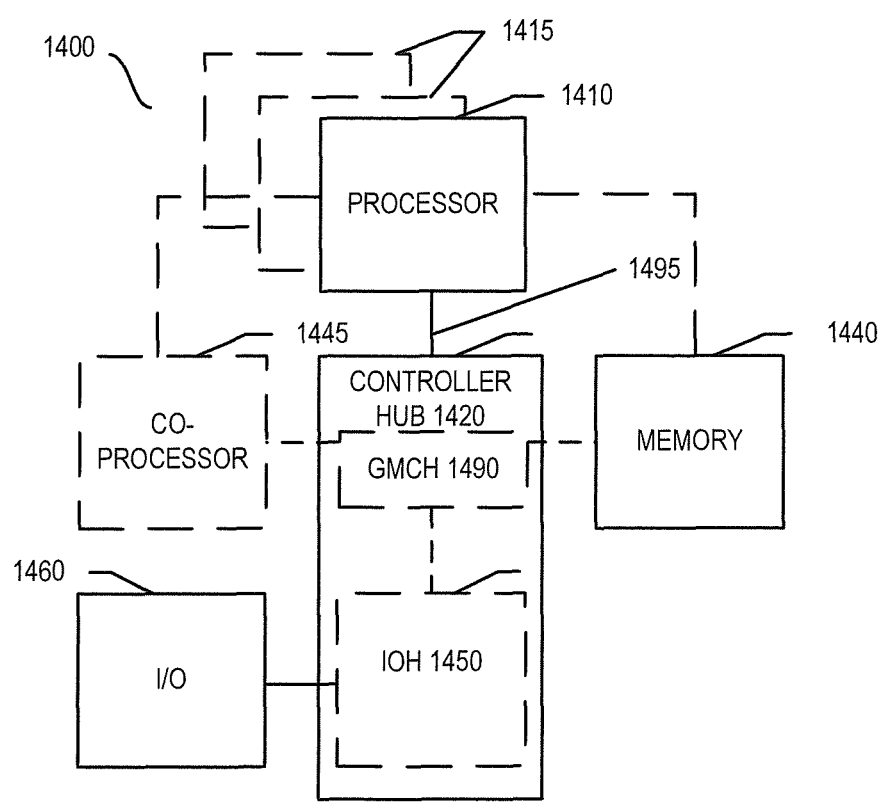
FIG. 14 shown is a block diagram of a system in accordance with one embodiment of the present invention.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
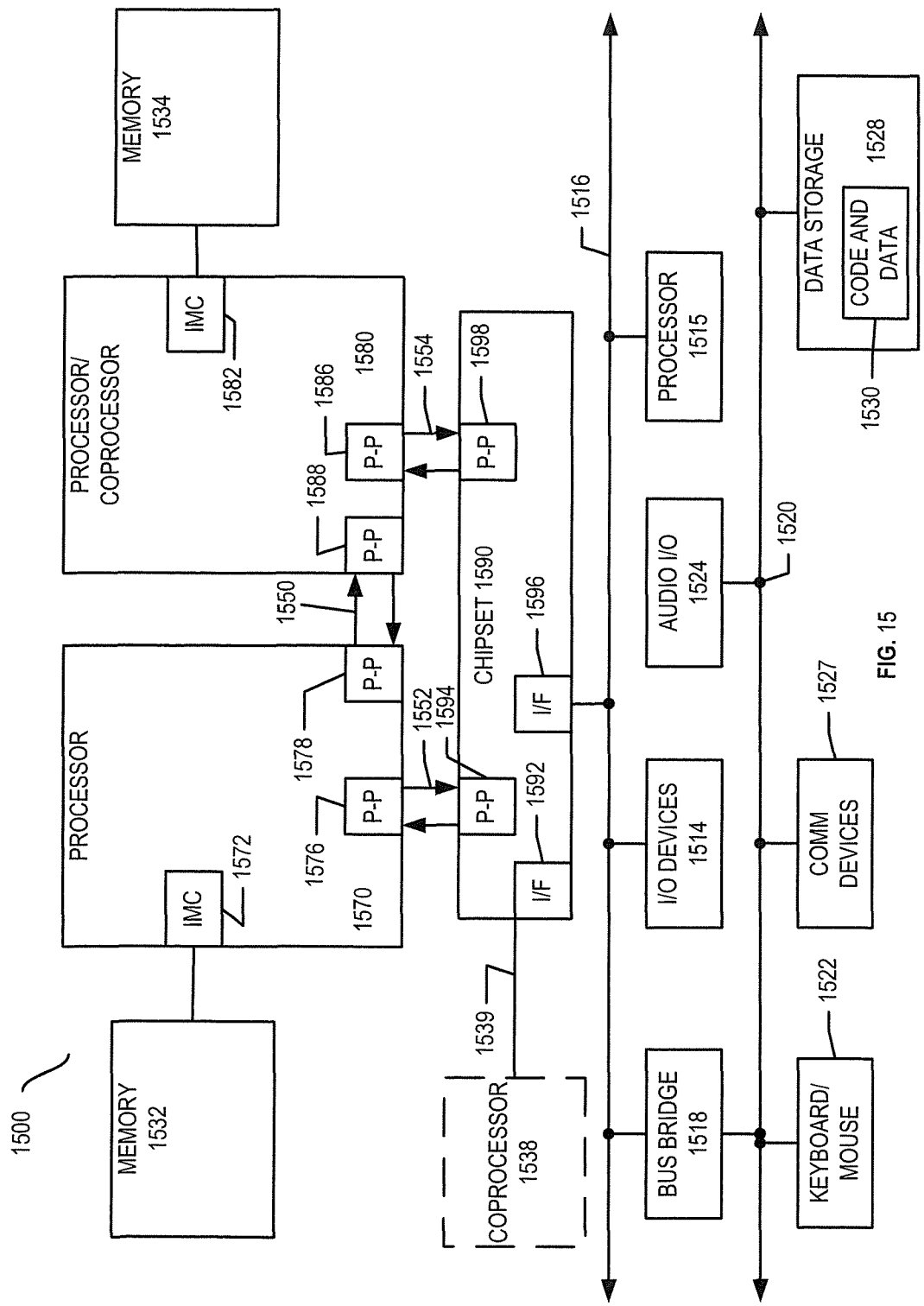
FIG. 15 shown is a block diagram of a first more specific exemplary system in accordance with an embodiment of the present invention.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
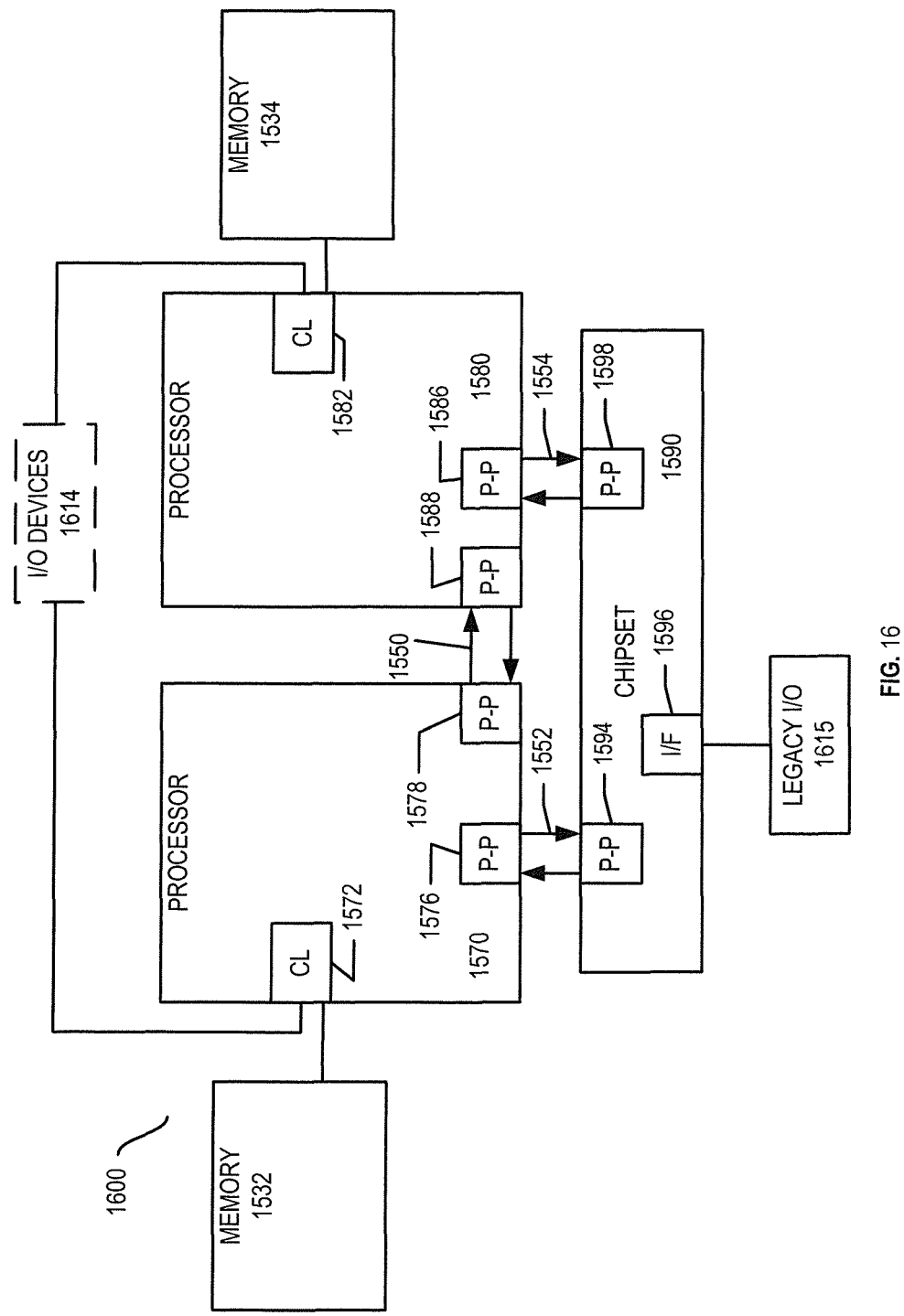
FIG. 16 shown is a block diagram of a second more specific exemplary system in accordance with an embodiment of the present invention.

Referring now to FIG. 16, shown is a block diagram of a second more specific exemplary system 1600 in accordance with an embodiment of the present invention Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
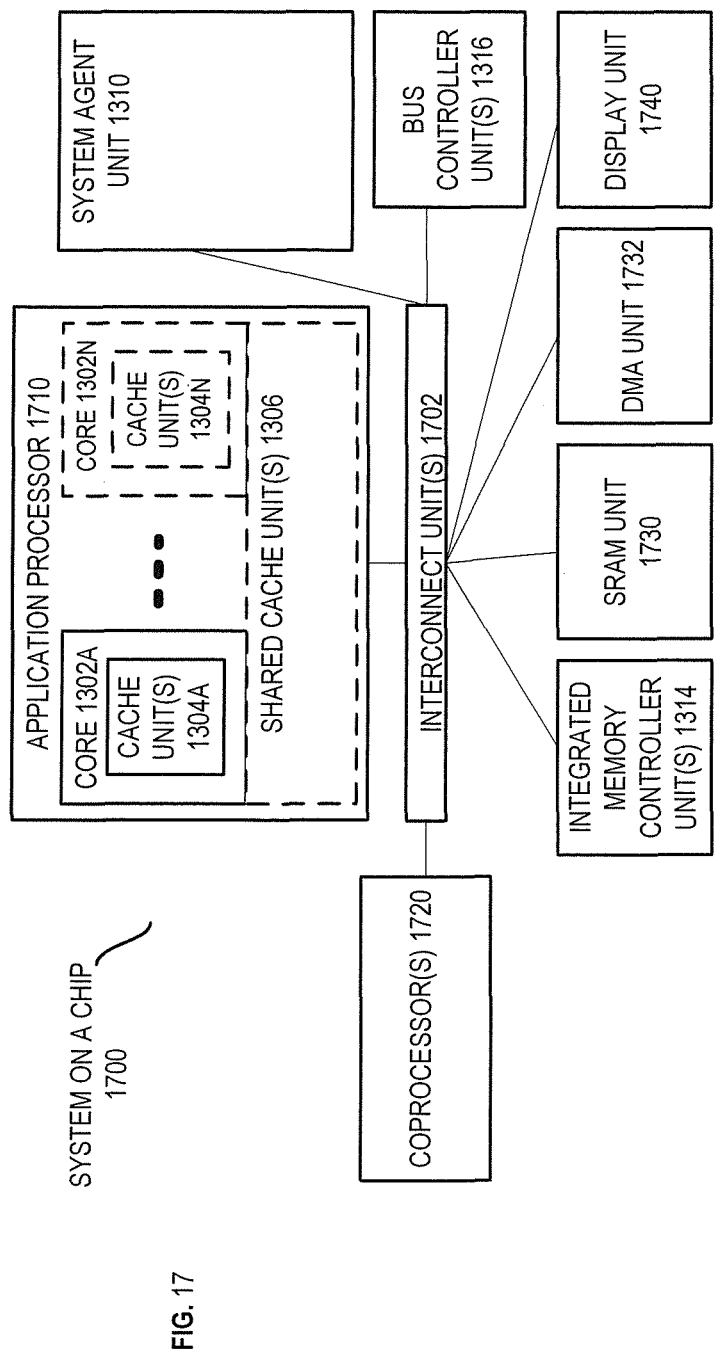
FIG. 17 shown is a block diagram of a SoC in accordance with an embodiment of the present invention.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

In a broad sense, the embedded key may be considered a first type of key (e.g., in ROM, RTL, etc.), the PUF key may be considered a second type of key that is different than the first (e.g., generated from PUF, harder to determine through reverse engineering than the embedded key, etc.), and the fuse key may be considered a third type of key that is different than the first and second types (e.g., to be programmed to fuses, yet to be provisioned, etc.).

In the description above, PUF keys have been described. In alternate embodiments, PUF keys may be replaced by keys with similar attributes to PUF keys. For example, in other embodiments, rather than PUF, other technologies having similar desirable attributes to PUF may optionally be used instead. For example, in some embodiments, rather than PUF other logic may be used that is one or more of: (a) impractical to replicate; (b) operable to provide substantially static bits as output; (c) operable to provide substantially random bits as output; (d) operable to provide bits as output having binary values that depend at least in part on process variations experienced during manufacture of the logic. As another example, in some embodiments, another technology for generating bits or keys that is substantially hard to detect (e.g., harder to detect through reverse engineering than embedded key and/or a key stored in ROM, RTL, or tie-ups/tie-downs) may be used in place of the PUF cells/PUF keys.

As used herein, for simplicity of description, a fuse key, an embedded key, a PUF key, and the like, are often referred to in the singular. It is to be appreciated that where a single key has been referred to that the single key may be either logically recognized or used as either one or more keys. For example, when a fuse key has been referred to, that fuse key may actually be recognized as one or more keys.

In the description and claims, the terms "coupled" and "connected," along with their derivatives, may be used. It should be understood that these terms are not intended as synonyms for each other. Rather, in particular embodiments, "connected" may be used to indicate that two or more elements or components are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. It will also be appreciated, by one skilled in the art, that modifications may be made to the embodiments disclosed herein, such as, for example, to the configurations, functions, and manner of operation of the embodiments. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc.

One or more embodiments include an article of manufacture (e.g., a computer program product) that includes a machine-readable medium. The medium may include a mechanism that provides, for example stores or transmits, information in a form that is accessible and/or readable by the machine. The machine accessible and/or machine-readable medium may provide, or have stored thereon, one or more or a sequence of instructions and/or data structures that if executed by a machine causes or results in the machine performing, and/or causes the machine to perform, one or more or a portion of the operations or methods or the techniques shown in the figures disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

Examples of suitable machines include, but are not limited to, computer systems, desktops, laptops, notebooks, netbooks, nettops, Mobile Internet devices (MIDs), network devices, routers, switches, cellular phones, media players, and other electronic devices having one or more processors or other instruction execution devices. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more busses and bridges (also termed bus controllers).

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
applying one or more electrical signals to a set of Physically Unclonable Function (PUF) cells, of an integrated circuit device, and receiving a set of PUF bits from the PUF cells in response;
generating a PUF public key and a PUF secret key based on the set of PUF bits; and
outputting, from the integrated circuit device, an encryption of the PUF public key with an embedded key, to a first manufacturing equipment, which is one of (1) a tester and prober and (2) test and debug equipment, through electrical probes of the first manufacturing equipment that are in contact with electrical contacts of the integrated circuit device, which are at least one of pads, bumps, solder material, and pins of the integrated circuit device;

receiving, at the integrated circuit device, a public key encryption of a fuse key with the PUF public key from electrical probes of a second manufacturing equipment that are in contact with the electrical contacts of the integrated circuit device, which are said at least one of the pads, the bumps, the solder material, and the pins, wherein the second manufacturing equipment is one of (1) a tester and prober and (2) test and debug equipment, and wherein the first and second manufacturing equipment are at different locations;

decrypting the public key encryption of the fuse key with the PUF public key using the PUF secret key; and programming fuses of the integrated circuit device with at least one of the fuse key and the received encryption of the fuse key with the PUF key at a time of manufacture of the integrated circuit device.

2. The method of claim 1, wherein generating the PUF public key comprises generating the PUF public key from the set of PUF bits.

3. The method of claim 1, further comprising accessing the embedded key from at least one of a read only memory (ROM), a resistor-transistor logic (RTL), a set of tie-ups, and a set of tie-downs.

4. The method of claim 1, wherein outputting comprises outputting a public key encryption of the PUF public key with an embedded public key.

5. The method of claim 1, wherein the outputting is performed at a first stage of the manufacture of the integrated circuit device and the receiving is performed at a second, different stage of the manufacture of the integrated circuit device.

6. The method of claim 1, further comprising, after receiving the public key encryption of the fuse key with the PUF public key, sending an authentication message to authenticate at least one of the fuse key and the received public key encryption of the fuse key.

7. An integrated circuit device comprising:

a set of Physically Unclonable Function (PUF) cells to provide a set of PUF bits in response to a stimuli;

PUF key generation logic coupled with the set of PUF cells to generate a PUF public key and a PUF secret key based on the set of PUF bits;

an embedded key;

encryption logic coupled with the embedded key and the PUF key generation logic, the encryption logic to generate an encryption of the PUF public key with the embedded key;

decryption logic coupled with the PUF key generation logic to decrypt an encryption of a fuse key with the PUF public key by using the PUF secret key; and a plurality of fuses to be programmed with at least one of the encryption of the fuse key with the PUF public key and the fuse key.

8. The integrated circuit device of claim 7, wherein the PUF key generation logic is to generate the PUF public key and the PUF secret key by using PUF bits.

9. The integrated circuit device of claim 7, wherein the embedded key is implemented in at least one of read only memory (ROM), resistor-transistor logic (RTL), metal tie-ups, and metal tie-downs.

10. The integrated circuit device of claim 7, wherein the decryption logic is to decrypt a public key encryption of the fuse key with the PUF public key by using the PUF secret key.

11. The integrated circuit device of claim 7, wherein the encryption logic is to perform a public key encryption of the PUF public key with an embedded public key.

12. The integrated circuit device of claim 7, wherein the integrated circuit device is to output the encryption of the PUF public key with the embedded key to a first manufacturing equipment at a first stage of manufacture, and wherein the integrated circuit device is to receive the encryption of the fuse key with the PUF public key from a second, different manufacturing equipment at a second, different stage of manufacture.

13. The integrated circuit device of claim 7, wherein the fuses are to be programmed with the received encryption of the fuse key with the PUF public key.

14. A system comprising:

an integrated circuit device, the integrated circuit device comprising:

a set of Physically Unclonable Function (PUF) cells to provide a set of PUF bits in response to one or more electrical signals;

PUF key generation logic coupled with the set of PUF cells to generate a PUF public key and a PUF secret key based on the set of PUF bits;

an embedded key;

encryption logic coupled with the embedded key and the PUF key generation logic, the encryption logic to generate an encryption of the PUF public key with the embedded key;

decryption logic coupled with the PUF key generation logic to decrypt an encryption of a fuse key with the PUF public key by using the PUF secret key; and a plurality of fuses; and manufacturing equipment coupled with the integrated circuit device, wherein the manufacturing equipment is one of (1) a tester and prober and (2) test and debug equipment that has at least one probe and is also operative to communicate with a secure key provisioning system, the manufacturing equipment to program the plurality of fuses with at least one of the fuse key and the encryption of the fuse key with the PUF public key, wherein the manufacturing equipment is not to be coupled with the integrated circuit device until a manufacture stage after the encryption of the PUF public key with the embedded key has been transmitted from the integrated circuit device.

15. The system of claim 14, wherein the encryption logic is to perform a public key encryption of the PUF public key with an embedded public key.

16. A method comprising:

applying one or more electrical signals to a set of Physically Unclonable Function (PUF) cells, of an integrated circuit device, and receiving a set of PUF bits from the PUF cells in response;

outputting, from the integrated circuit device, an encryption of a first public key which is to have been derived from the PUF bits with an embedded key, to a first manufacturing equipment, through electrical probes of the first manufacturing equipment that are in contact with electrical contacts of the integrated circuit device, which are at least one of pads, bumps, solder material, and pins of the integrated circuit device;

receiving, at the integrated circuit device, a public key encryption of a fuse key with the first public key from electrical probes of a second manufacturing equipment that are in contact with the electrical contacts of the integrated circuit device, which are said at least one of the pads, the bumps, the solder material, and the pins, wherein the first and second manufacturing equipment are at different locations; and decrypting the public key encryption of the fuse key with the first public key using a secret key which is to have been derived from the PUF bits; and programming fuses of the integrated circuit device with at least one of the fuse key and the received encryption of the fuse key with the first public key at a time of manufacture of the integrated circuit device.

17. A system comprising:

an integrated circuit device, the integrated circuit device comprising:

a set of Physically Unclonable Function (PUF) cells to provide a set of PUF bits in response to one or more electrical signals;

key generation logic coupled with the set of PUF cells to generate a first public key and a second secret key based on the set of PUF bits;

an embedded key;

encryption logic coupled with the embedded key and the key generation logic, the encryption logic to generate an encryption of the first public key that is to be derived from the PUF bits with the embedded key;

decryption logic coupled with the key generation logic to decrypt an encryption of a fuse key with the first public key by using the second secret key; and a plurality of fuses; and manufacturing equipment having at least one probe that is to contact at least one electrical contact of the integrated circuit device, which is one of a pad, a bump, a solder material, and a pin, wherein the manufacturing equipment is one of (1) a tester and prober and (2) test and debug equipment, the manufacturing equipment to program the plurality of fuses with at least one of the fuse key and the encryption of the fuse key with the first public key, wherein the at least one probe of the manufacturing equipment is not to contact the at least one electrical contact of the integrated circuit device until a second manufacture stage later than a first manufacturing stage at which the encryption of the first public key with the embedded key is to be provided from the integrated circuit device to a different manufacturing equipment.

* * * * *